US007946477B1

(12) United States Patent
Ramachandran et al.

(10) Patent No.: US 7,946,477 B1
(45) Date of Patent: May 24, 2011

(54) AUTOMATED BANKING MACHINE WITH NONCONTACT READING OF CARD DATA

(75) Inventors: Natarajan Ramachandran, Uniontown, OH (US); Mark A. Douglass, North Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 831 days.

(21) Appl. No.: 11/975,907

(22) Filed: Oct. 22, 2007

Related U.S. Application Data

(63) Continuation-in-part of application No. 11/093,741, filed on Mar. 29, 2005, now Pat. No. 7,284,692.

(60) Provisional application No. 60/557,937, filed on Mar. 31, 2004, provisional application No. 60/918,453, filed on Mar. 16, 2007, provisional application No. 60/918,455, filed on Mar. 16, 2007, provisional application No. 60/918,458, filed on Mar. 16, 2007.

(51) Int. Cl.
*G06K 5/00* (2006.01)
(52) U.S. Cl. ........................................ 235/379; 235/492
(58) Field of Classification Search .................. 235/375, 235/379, 383, 385, 380, 382, 492, 493
See application file for complete search history.

(56) References Cited

U.S. PATENT DOCUMENTS

| 7,004,385 B1 * | 2/2006 | Douglass | 235/379 |
| 7,194,441 B2 * | 3/2007 | Bartz et al. | 705/75 |
| 2006/0106735 A1 * | 5/2006 | Bartz et al. | 705/75 |
| 2007/0167216 A1 * | 7/2007 | Walker et al. | 463/18 |

* cited by examiner

*Primary Examiner* — Thien M Le
(74) *Attorney, Agent, or Firm* — Ralph E. Jocke; Daniel D. Wasil; Walker & Jocke

(57) ABSTRACT

An automated banking machine can receive user card data from a cell phone. The phone stores the card data of several selectable cards, including electronic account number data. The machine generates and displays a random number correlated with a time period. A machine user manually inputs the displayed random number into their phone. The phone's banking software application encrypts the selected card's data along with the inputted random number data. The phone displays a bar code image containing the encrypted data. The machine includes a bar code reader which can read the displayed image. The machine causes the read data to be decrypted. The random number is used to verify the current transaction session. Thereafter, normal transaction flow can follow, including PIN input. The process replaces physical insertion of a card yet allows secure input of the card's data. Fraudulent activities requiring card insertion are also reduced.

24 Claims, 11 Drawing Sheets

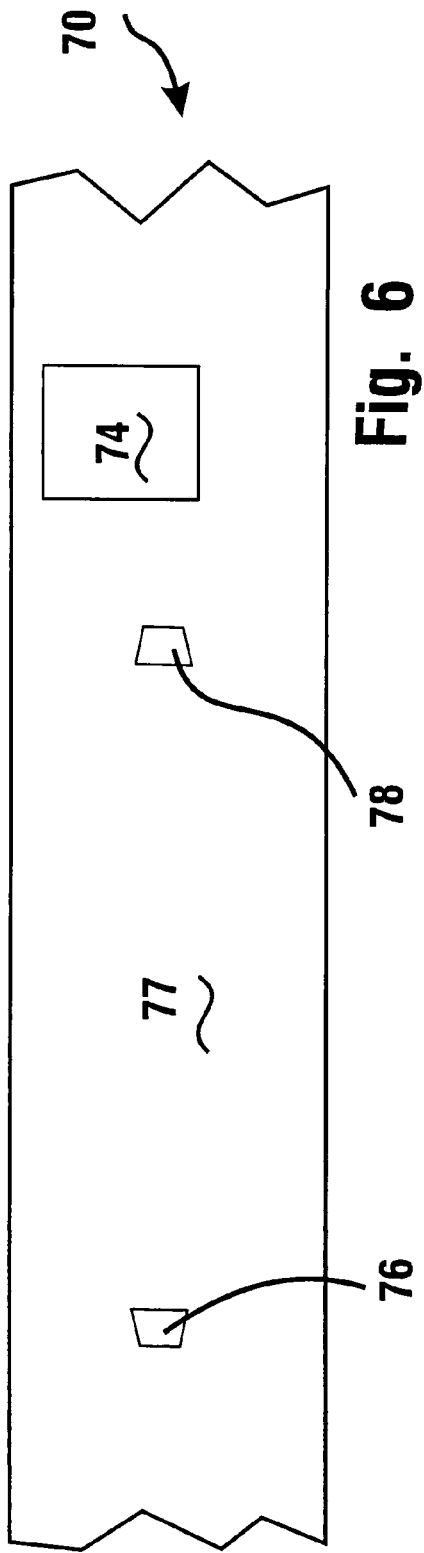
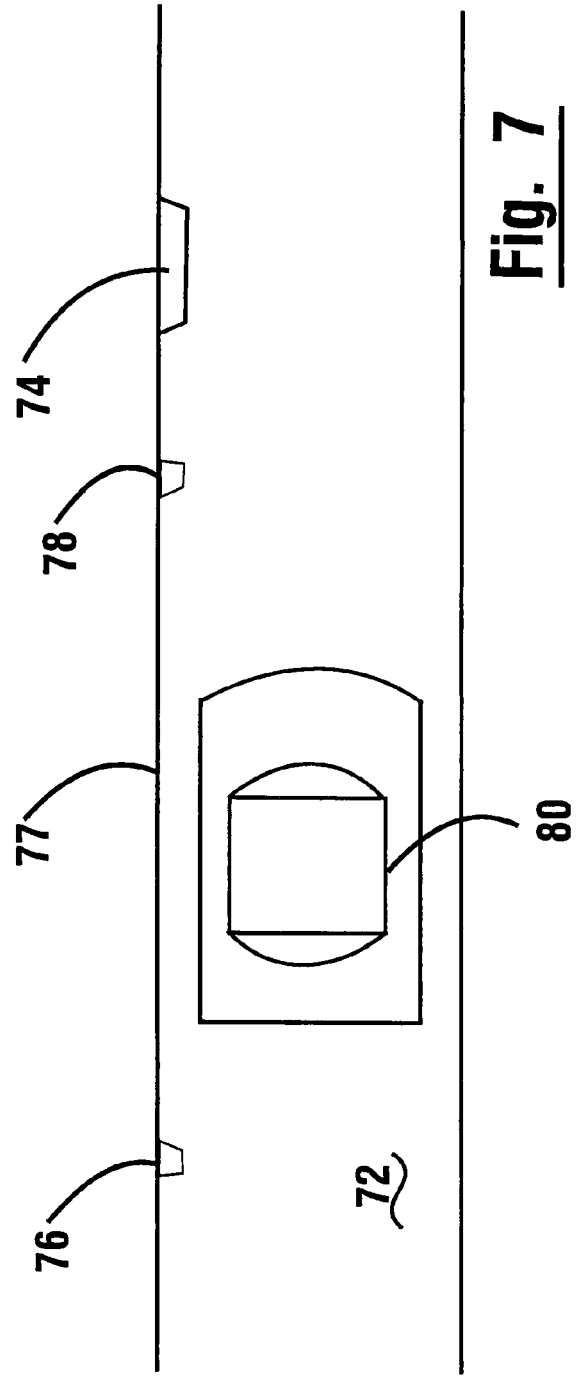
Fig. 6
Fig. 7

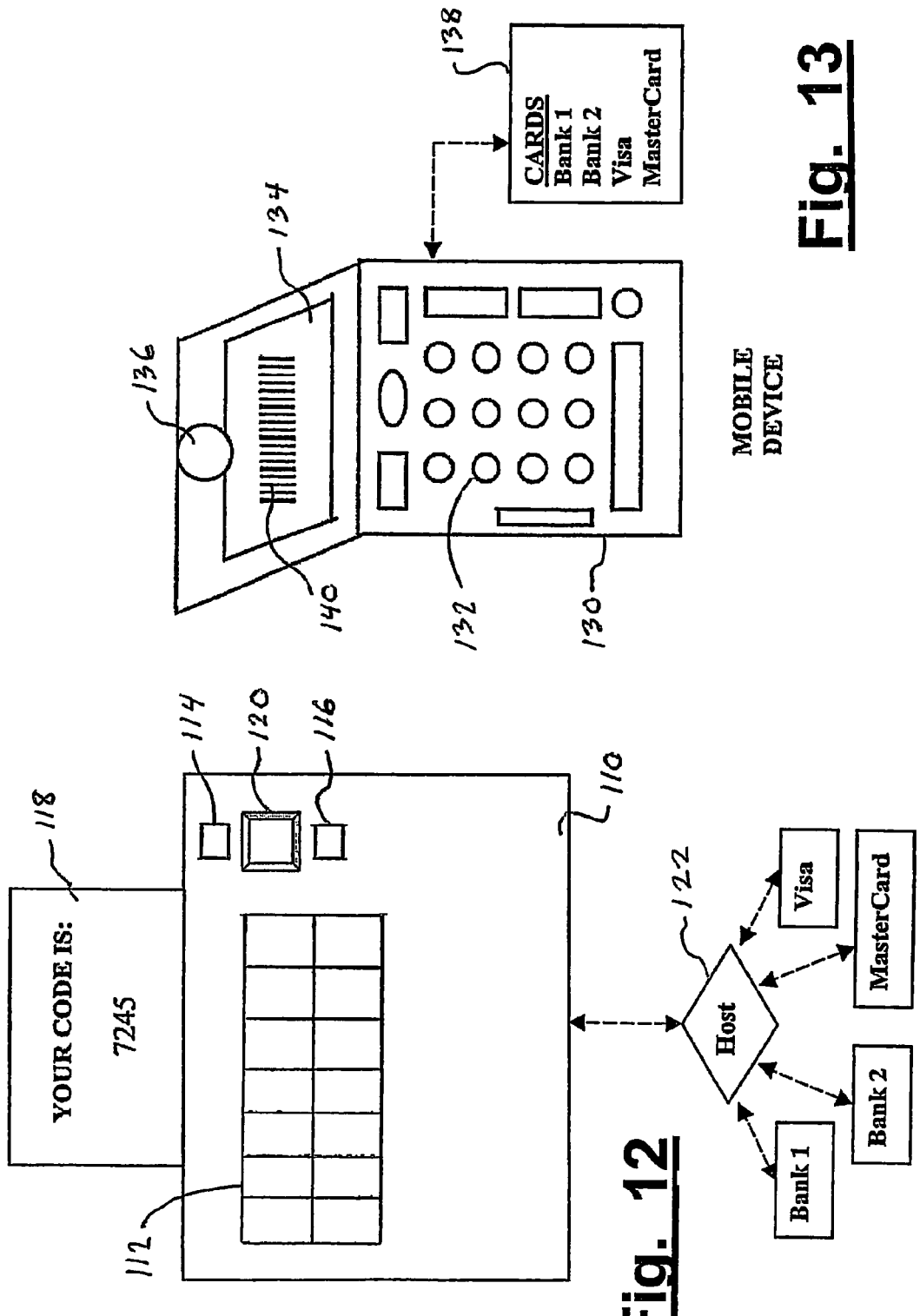

AUTOMATED BANKING MACHINE WITH NONCONTACT READING OF CARD DATA

CROSS REFERENCE TO RELATED APPLICATIONS

This application claims the benefits of U.S. Provisional Applications 60/918,453, 60/918,455, and 60/918,458 each filed Mar. 16, 2007; and this application is a continuation-in-part of U.S. application Ser. No. 11/093,741 filed Mar. 29, 2005, now U.S. Pat. No. 7,284,692, which claims the benefit of U.S. Provisional Application 60/557,937 filed Mar. 31, 2004, and the disclosures of each Application are herein incorporated by reference.

TECHNICAL FIELD

This invention relates to banking systems controlled by data bearing records. Exemplary embodiments include card-activated automated banking machine apparatus, systems, and methods that provide improved security, reliability, and serviceability.

BACKGROUND OF INVENTION

Automated transaction machines include automated banking machines. A common type of automated banking machine is an automated teller machine ("ATM"). ATMs may be used to perform transactions such as dispensing cash, accepting deposits, making account balance inquiries, paying bills, and transferring funds between accounts. ATMs and other types of automated banking machines may be used to dispense media or documents such as currency, tickets, scrip, vouchers, checks, gaming materials, receipts, or other media. While many types of automated banking machines, including ATMs, are operated by consumers, other types of automated banking machines may be operated by service providers. Such automated banking machines may be used by service providers to provide cash or other types of sheets or documents when performing transactions. For purposes of this disclosure, an automated banking machine or ATM shall be construed as any machine that is capable of carrying out transactions which include transfers of value.

A popular brand of automated banking machine is manufactured by Diebold, Incorporated. Such automated banking machines are capable of receiving therein a banking card from a user of the machine. The card can have user information embedded in a magnetic stripe on the card. A machine card reader is capable of reading the magnetic stripe. The information may correspond to a user's personal identification number (PIN). The user generally can enter the PIN through use of a machine keypad. The machine operates either by itself or in conjunction with one or more connected systems to determine whether the keypad-entered PIN matches the card-entered PIN. Upon determination of a match, the user can be authorized to carry out one or more transactions with the machine. Such a transaction may include dispensing cash such as currency notes to the machine user.

Magnetic stripe cards can have the problem of wearing out. Magnetic stripe cards are also susceptible to being duplicated. The contact head of a contact type card reader can be subject to excessive dirt accumulation or wear due to physical contact with cards. These conditions present the increased potential for fraud and/or requiring card reader maintenance which may place an automated banking machine out of service. The location and space required by a contact type card reader can also limit a machine from presenting additional banking features to a user.

DISCLOSURE OF INVENTION

It is an object of an exemplary form of the present invention to provide an automated banking machine.

It is a further object of an exemplary form of the present invention to provide an automated banking machine with an improved card data reader arrangement.

It is a further object of an exemplary form of the present invention to provide improvements to card readers used in automated banking machines.

It is a further object of an exemplary form of the present invention to enable card readers to be readily installed in existing automated banking machines to increase the machine's functionality.

It is a further object of an exemplary form of the present invention to provide an automated banking machine with a card data reader that requires less service.

It is a further object of an exemplary form of the present invention to provide an automated banking machine with a card data reader that requires less fascia space.

It is a further object of an exemplary form of the present invention to provide an automated banking machine that is capable of reading user card data in a contactless manner.

It is a further object of an exemplary form of the present invention to provide an automated banking machine with a contactless card data reader.

It is a further object of an exemplary form of the present invention to provide a method of reading bank card data with an automated banking machine.

It is a further object of an exemplary form of the present invention to provide a method for upgrading an existing machine to provide for improved card data reading.

Further objects of exemplary forms of the present invention will be made apparent in the following Best Mode For Carrying Out Invention and the appended claims.

The foregoing objects can be accomplished in an exemplary embodiment of the present invention by providing an automated banking machine with a contactless card data reader. A contactless card reader may be installed in new automated banking machines or in existing machines without further substantial modifications to the machines. Security risks may be reduced. As service issues could be reduced without the wear due to card reader head/card contact, use of a contactless card reader enables enhanced machine reliability at a modest cost.

An RFID card and RFID card reader arrangement can be used instead of, or as an adjunct to, a conventional card and contact type card reader arrangement. A card data image and image reader arrangement can also be used.

BRIEF DESCRIPTION OF DRAWINGS

FIG. 6 shows a side view of an ATM drive-thru arrangement.

FIG. 7 shows a top view of an ATM drive-thru arrangement.

FIG. 12 shows an automated transaction machine and host arrangement, with the machine having card data image reading capabilities.

FIG. 13 shows a mobile device having image display capabilities, with the image including card data.

BEST MODE FOR CARRYING OUT INVENTION

Figure 1:
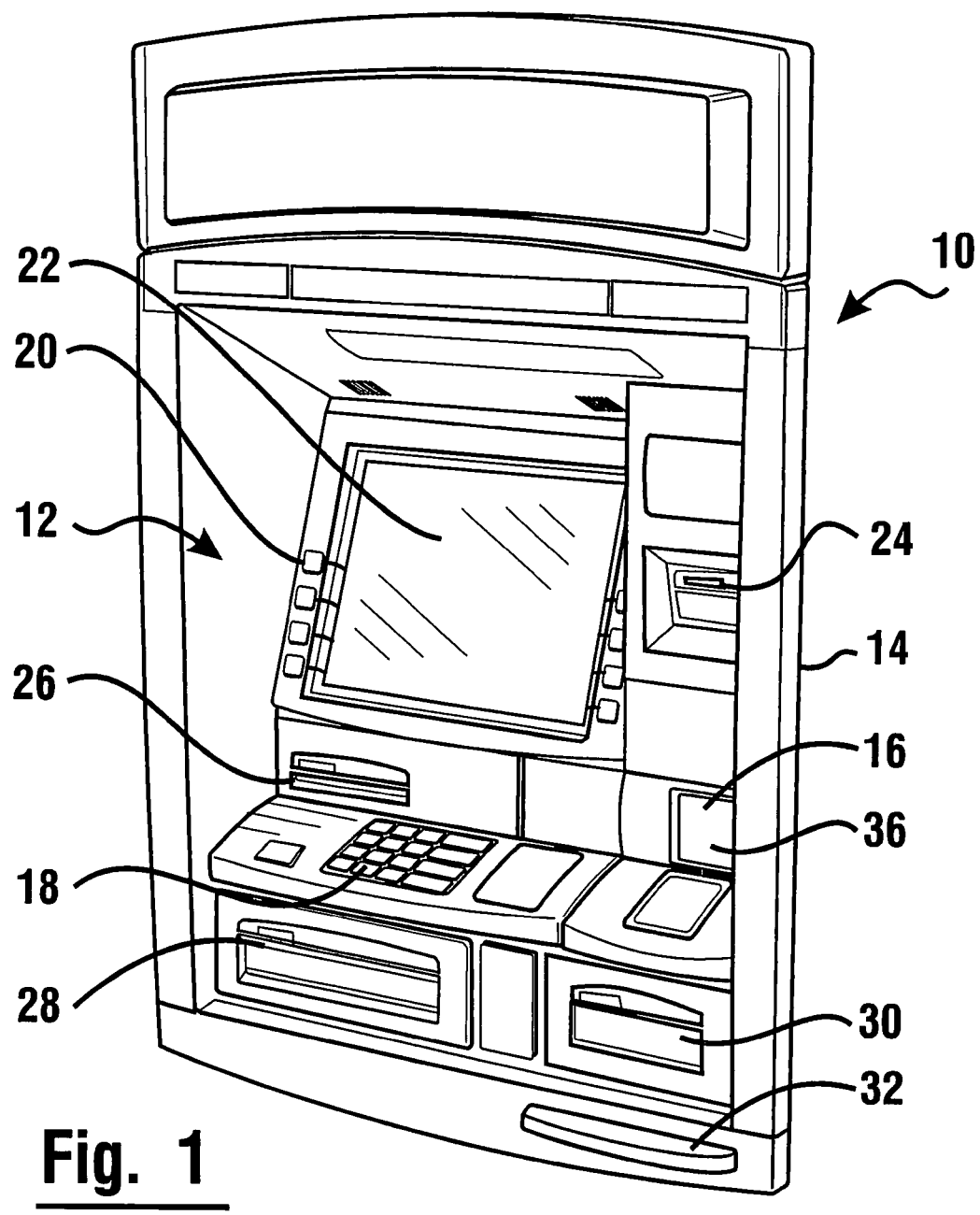
FIG. 1 is a side schematic view of an automated banking machine.

Referring now to the drawings and particularly to FIG. 1 there is shown therein an automated banking machine, generally indicated by numeral 10, used in connection with exemplary embodiments of the present invention. A banking system that is controlled by data bearing records includes the automated banking machine 10. The automated banking machine 10 can be an automated teller machine (ATM). The ATM can include one or more cash dispensers that are operative to a dispense cash to users of the machine. The automated banking machine 10 includes a fascia 12 which serves as a user interface (or customer interface).

The automated banking machine 10 includes a housing 14 which houses certain components of the machine. The components of the machine can include input and output devices. The input devices may include a reader device schematically indicated 16. The reader device is operative to read data bearing records presented by machine users. Such records can include data corresponding to at least one of the associated user, one or more user financial accounts, and/or other data. In an exemplary arrangement the reader device 16 comprises a card reader that is operative to read a customer's card. An exemplary card can include information about the customer thereon or therein, such as the customer's name, account number, and/or other data.

A card reader may comprise a magnetic stripe card reader which is able to read data from magnetic stripes of cards. However, in an exemplary embodiment the card reader is operative to read data from other types of cards or records, such as contactless cards. For example, the card reader 16 may comprise a contactless card reader. Of course, these approaches are exemplary.

The fascia can include a keypad 18, function keys 20, display 22, receipt outlet slot 24, mini account statement outlet 26, document (e.g., cash) withdrawal opening 28, document deposit opening 30, and a writing shelf 32. It should be understood that these transaction function devices and features of the described ATM user interface are exemplary and in other embodiments the user interface may include different components and/or features and/or arrangements.

Figure 2:
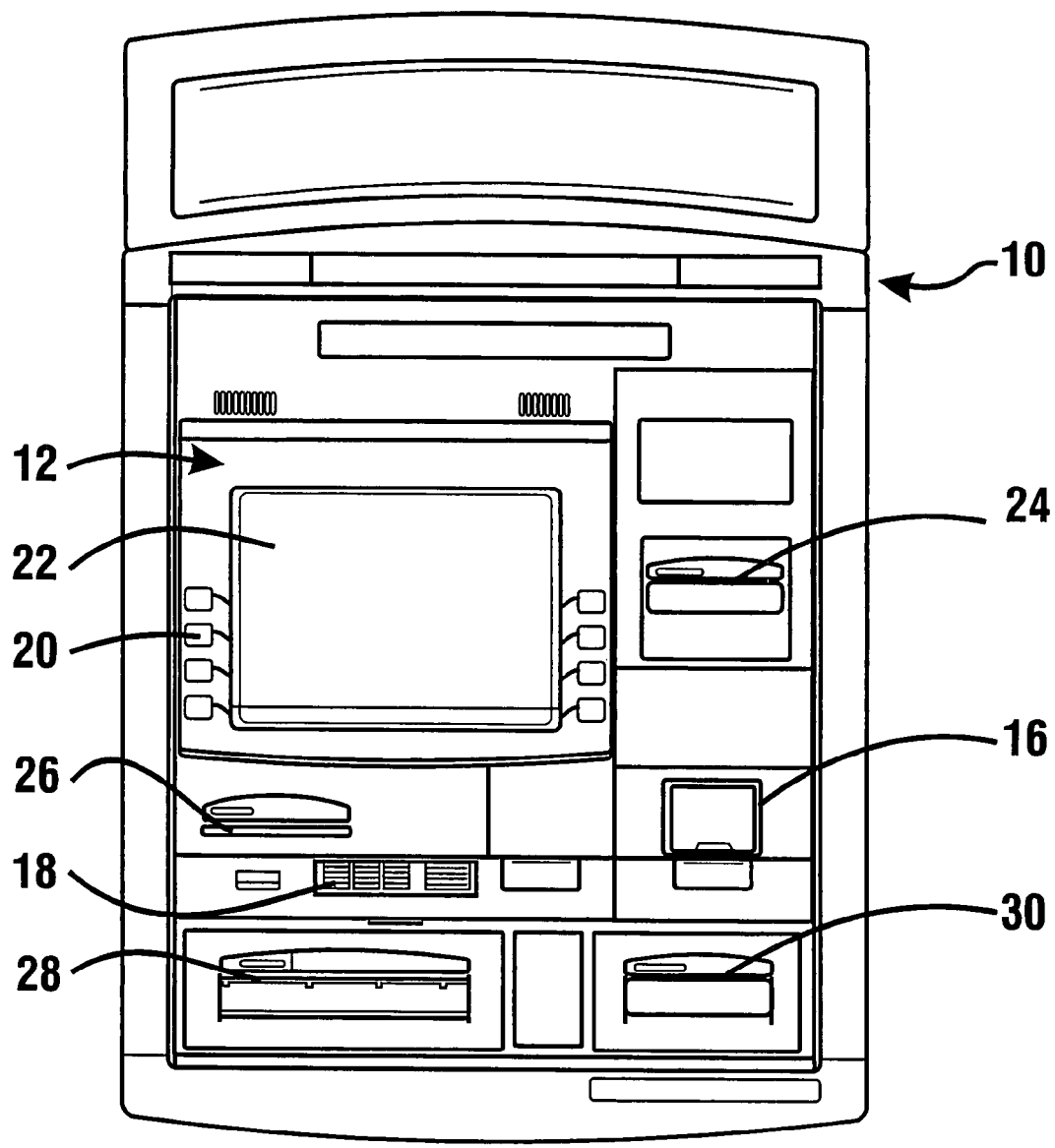
FIG. 2 shows a front view of the automated banking machine of FIG. 1.

FIG. 2 shows a front view of the automated banking machine 10 of FIG. 1. The keypad 18 can include a plurality of input keys which may be actuated by a customer to provide manual inputs to the machine. The function keys 20 can be used to permit a customer to respond to screen prompts.

The display 22 is viewable by an operator of the machine. The display enables outputs through a display screen. The display may also enable inputs through the display screen. Thus, the display can be a display type that enables both outputs and inputs. Therefore the display can be both an input device and an output device. For example, the display 22 may be a touch screen display which enables outputs through displays on the screen and enables customers to provide inputs by placing a finger adjacent to areas of the screen. A combined input and output device, such as a touch screen display, can provide outputs to a user as well as receiving inputs from the user. The display 22 may include an LCD, plasma, CRT or other display type that is capable of providing visible indicia, such as still images or moving video, to a customer.

It should be understood that in various forms of the invention other types of input devices may be used, such as biometric readers that may be operative to receive customer identifying inputs such as fingerprints, iris scans, retina scans, and face topography data that provide data that is usable to identify a user. One or more camera devices may also be used to serve as input devices for biometric features and the like. Other input devices such as speech or voice recognition devices, facial recognition arrangements, inductance type readers, IR type readers, and other types of devices which are capable of receiving information that identifies (or can be used to identify) a customer and/or their account may also be used. An example of an ATM that uses biometric input devices and other types of input devices is shown in U.S. Pat. No. 6,023,688, the disclosure of which is herein incorporated by reference.

Further output devices associated with the exemplary user interface can include a speaker. A headphone jack can also be used to serve as an output device. A headphone jack may be connected to a headphone provided by a user who is visually impaired to provide the user with voice guidance in the operation of the machine. Alternatively, the machine 10 may provide a headphone for a customer.

The automated banking machine 10 may also include a receipt provider which is operative to provide users of the machine with receipts reflecting transactions conducted at the machine. A printer device can be used that is operative to print receipts. Transaction receipts may be provided to users through a receipt delivery slot extending through a fascia portion. Exemplary receipt printers that may be used in some embodiments are shown in U.S. Pat. No. 5,729,379 and U.S. Pat. No. 5,850,075, the disclosures of which are herein incorporated by reference.

Exemplary embodiments may also include other types of printing mechanisms such as statement printer mechanisms, ticket printing mechanisms, check printing mechanisms, and other devices that operate to apply indicia to media in the course of performing transactions carried out with the machine.

In other embodiments, output devices may include devices such as audio speakers, IR transmitters, or other types of devices that are capable of providing outputs which may be perceived by a user either directly or through use of a computing device, article, or machine.

Exemplary automated banking machine features and systems are further shown in U.S. Pat. Nos. 6,705,517; 6,682,068; 6,672,505; and 6,598,023, the disclosures of which are incorporated herein by reference.

The machine 10 can also include a deposit acceptance area. The deposit acceptance area is an area through which deposits or deposit documents, such as deposit envelopes, to be deposited by users can be placed into the machine. The deposit acceptance area can include the document deposit opening 30. The deposit opening 30 is in operative connection with a deposit accepting device positioned in a secure chest area of the machine. Exemplary types of deposit accepting devices are shown in U.S. Pat. No. 4,884,769 and U.S. Pat. No. 4,597,330, the disclosures of which are herein incorporated by reference.

It should be understood that these input and output devices of the user interface are exemplary and in other embodiments, other or different input and output devices may be used.

The automated banking machine 10 can include one or more internal computers, which may be alternatively referred to herein as controllers. These internal computers can include one or more processors. These processors may be in operative connection with one or more data stores. In some embodiments, processors can be located on certain devices within the ATM so as to individually control the operation thereof. Examples such as multi-tiered processor systems are shown in U.S. Pat. No. 6,264,101 and U.S. Pat. No. 6,131,809, the disclosures of which are herein incorporated by reference.

In an exemplary arrangement to conduct transactions, the machine 10 can communicate with one or more computers remotely located from the machine. These remote computers are operative to exchange messages with the machine. For example, the remote computers may be used to authorize and record the occurrence of various transactions.

The machine 10 may communicate through a network with a transaction host, such as a bank or financial transaction entity. The host has at least one computer which is operative to exchange messages with the machine. For example, a bank may receive one or more messages from the machine requesting authorization to allow a customer to withdraw $200 from the customer's account. A computer at the bank can operate to determine that such a withdrawal is authorized. The computer, or another computer affiliated therewith, can then return one or more messages to the machine through the network authorizing the machine to allow the withdrawal transaction.

In an exemplary embodiment, at least one processor in the machine 10 is operative to cause the communication of data corresponding to data read from a user's card. The read card data can be sent from the machine to a remote (bank) computer as part of one or more messages. The machine may also communicate other data corresponding to user inputs to the remote computer, such as a personal identification number (PIN), a primary account number (PAN), and/or transaction request data. The remote computer can operate to compare the data corresponding to card data and/or PIN data to stored data, which corresponds to authorized users, in at least one data store associated with the remote computer. Responsive to the data corresponding to an authorized user and a permissible transaction request, the remote computer can communicate at least one message to the machine which corresponds to authorization to carry out the requested transaction.

After the machine 10 conducts the functions to accomplish a transaction, such as dispensing cash, the machine can send one or more messages back through the network to the bank indicating that the transaction was successfully carried out. Of course, these message types are merely exemplary and other transaction messages may be used.

It should be understood that in some embodiments the machine 10 may communicate with other entities and through various networks. For example, in an exemplary embodiment the machine can communicate with computers operated by machine service providers. Such service providers may comprise entities which are to be notified of status conditions or malfunctions of the machine, as well as entities who are to be notified of corrective actions. A service provider may be able to service a malfunctioning machine. An example of such a system for accomplishing this is shown in U.S. Pat. No. 5,984,178, the disclosure of which is herein incorporated by reference.

Other third parties may also receive notifications from the machine 10. These other parties may include entities responsible for delivering currency to the machine to ensure that the currency supplies in the machine do not become depleted. Further entities may be responsible for removing deposited items from the machine.

Additional entities may be notified of actions at the machine. These additional entities may include entities which hold marketing data concerning consumers and who provide messages which correspond to marketing messages (e.g., advertisements) to be presented to consumers. These additional entities may also be able to communicate with the machine 10 to provide marketing messages to machine users.

Various types of messages may be provided to remote systems and entities by the machine depending on the capabilities of the machines in various embodiments and the types of transactions being conducted. Furthermore, machine communication with the various entities can be separate and independent of any machine communication with the transaction host. That is, communication may occur (directly) between the machine and a third party without involving the transaction host. Thus, the machine 10 can keep non financial transaction communication separated from financial transaction communication. The two (or more) open communication paths can also be operated independently simultaneously, with no path contingent on another.

In an exemplary embodiment discussed in more detail herein, an automated banking machine may use contactless reading devices or arrangements or techniques to obtain information from or about a customer. A non-contacting card reading device can be used. Unlike conventional contact type card reading which involves physical contact, the exemplary embodiments permit card reading to occur without requiring physical contact between the card reading device and the card.

For example, a customer bank card may include an indicator member or device such as a non-contact transponder to communicate with the automated banking machine. Radio frequency (e.g., radio waves) can be one manner in which to communicate in a non-contact relationship, e.g., communication not based on physical contact. Radio frequency (RF) type readers and/or RF transmitters can be used. Other types of remote communication may also be used.

A customer bank card can have one or more radio frequency identification (RFID) tags (or devices or indicator members). RFID tags may also be referred to as "smart labels." The tags can contain data indicative or reflective of customer information. RFID tags may operate on the RF backscatter principle. Data communication can occur between an RFID tag and a card reader 16 of an automated banking machine. An RFID reader can be arranged to interrogate the RFID tag to obtain information therefrom. RFID readers may also be referred to as "interrogators."

In exemplary embodiments, an RFID tag may be of a type that does not need a power source (e.g., battery), but operates based on RF energy provided by a reader. A tag may also have an internal antenna embedded in an RFID chip. An RFID reader can be equipped with the power necessary to activate the chip and receive the stored information therefrom. The RFID tags and readers discussed herein may have RFID Industry Standards developed by ANSI (American National Standards Institute) or the International Standards Organization (ISO) or other standard developing organizations. For purposes of this disclosure, an RFID tag will be considered to include any device which provides data output via RF signals, whether separate from or integral with another article, such as for example, a card.

A customer bank card in an exemplary embodiment may include information in non-contact RFID tags instead of or in addition to information in magnetic stripes and/or information in a programmable memory of a smart card. That is, magnetic stripe (or magnetic strip) cards and smart cards may further include customer RFID tags. One or more tags may be removably attached or mounted to a card (e.g., thereon or therein). Alternatively, tags may be permanently affixed to a card, such as embedded in a (plastic) portion of a card.

In an exemplary embodiment, an RFID tag is operative to store information therein representative of or corresponding to a customer, such as the customer's account number, PIN, name, primary bank, affiliated banks, and/or preferences. In an exemplary embodiment, tags can contain much more customer-related data than can be represented by a magnetic stripe (or magnetic strip) type of arrangement. For example, tags may also contain information reflective of additional security features, customer profile data, card age, display preferences, etc. A tag may also carry a unique customer identification number of 32 bits or longer. In the exemplary embodiment tags enable a card to store more information in a smaller space in comparison to prior art magnetic stripe cards.

RFID tags do not require physical contact (e.g., mechanical or electrical contact) with a card reader component. In an exemplary embodiment a customer can pass or wave their card adjacent to or over a card scanning area 36 associated with the card reader device 16 to have the card data (and user information) remotely read. The scanning area 36 can comprise a surface area of the ATM fascia. A card reader and an RFID card can be remotely (and wirelessly) separated during reading of the card. The contactless arrangement can prevent damage or deterioration (such as dirt accumulation, wear and tear) to a card reader, and may further reduce machine down time associated with maintenance and service. In an exemplary embodiment RFID cards are more difficult to counterfeit in comparison to prior art magnetic stripe cards.

In exemplary embodiments, RFID tags can have read-only or rewritable memory for storage of customer information. RFID tags can have a memory which can be changed or modified by authorized personnel or devices. The tag memory may be programmable. For example, an employee or machine associated with a bank may have a device operative to communicate with an RFID tag to change and/or insert data contained therein. A hand-held RFID tag communication device can be used. An automated banking machine (e.g., ATM) can incorporate a device for changing RFID data. For example, communication between an ATM and a machine user's RFID card may occur, such as during an ATM transaction (e.g., cash withdrawal transaction).

Alternatively, a tag may have unchangeable data. In such alternative situations, a combination of plural read-only tags may need to be assigned or attached to a particular card to fully represent its information content. A card may also have a combination of read-only and programmable tags.

An RFID reader device of an exemplary automated banking machine can be equipped to remotely read a user card. The reader is operative to read card data while the card is not in physical contact relationship with the machine. Thus, a card can be spaced from the card reader device during card reading. For example, a card reader device can be arranged to read RFID card data as a customer passes their card adjacent to a card scanning area associated with the card reader device. It follows that communication between a bank card and an ATM card reader can occur without physical contact, which would occur with the use of conventional contact type (e.g., magnetic stripe) card readers.

Because the physical aspects of a through-the-fascia portion of a contact type card reader interface can be avoided, the service and/or reliability issues for an RFID card reader compared to other contact type readers can be reduced and/or eliminated. Also, the wear of components (e.g., contact read head, mechanical card transports, and card sensors) associated with conventional contact type card readers can be eliminated. Furthermore, wear to a user's card can also be reduced.

In an exemplary embodiment, when a card having an RFID tag is within range of an ATM card reader, the reader device circuitry of the card reader can interrogate the tag to receive information corresponding to the particular card/user. The reader circuitry may comprise a circuit card assembly. The information exchanged between a card RFID tag and a card reader may be encrypted to provide additional security. Thus, a card reader, RFID data from the card, and/or an associated device may comprise a decoder in decoding circuitry.

The use of RFID reader technology permits an ATM to have a card reader located at a previously unacceptable position. The physical space of an RFID card reader and any RFID card reader interface (e.g., card scanning area) can be located at an area of the fascia different from the area previously required for a contact type card reader. Also, in some embodiments all or a portion of the RFID card reader device can be remotely mounted adjacent to the ATM. That is, an RFID card reader device need not be mounted on the fascia or ATM, but may be disposed from the ATM. An RFID card reader device can be positioned so as to free up fascia space for additional transaction devices, thus increasing an ATM's functionality. The freed up space allows other devices to be added to the valuable customer access area. For example, the additional fascia space may be used for installation of a cash acceptor, a stamp dispenser, check acceptor and/or an event ticket printer. Alternatively, in some embodiments the ability to eliminate the conventional card reader on the fascia can be used to produce more compact machines and/or user interfaces.

Figure 3:
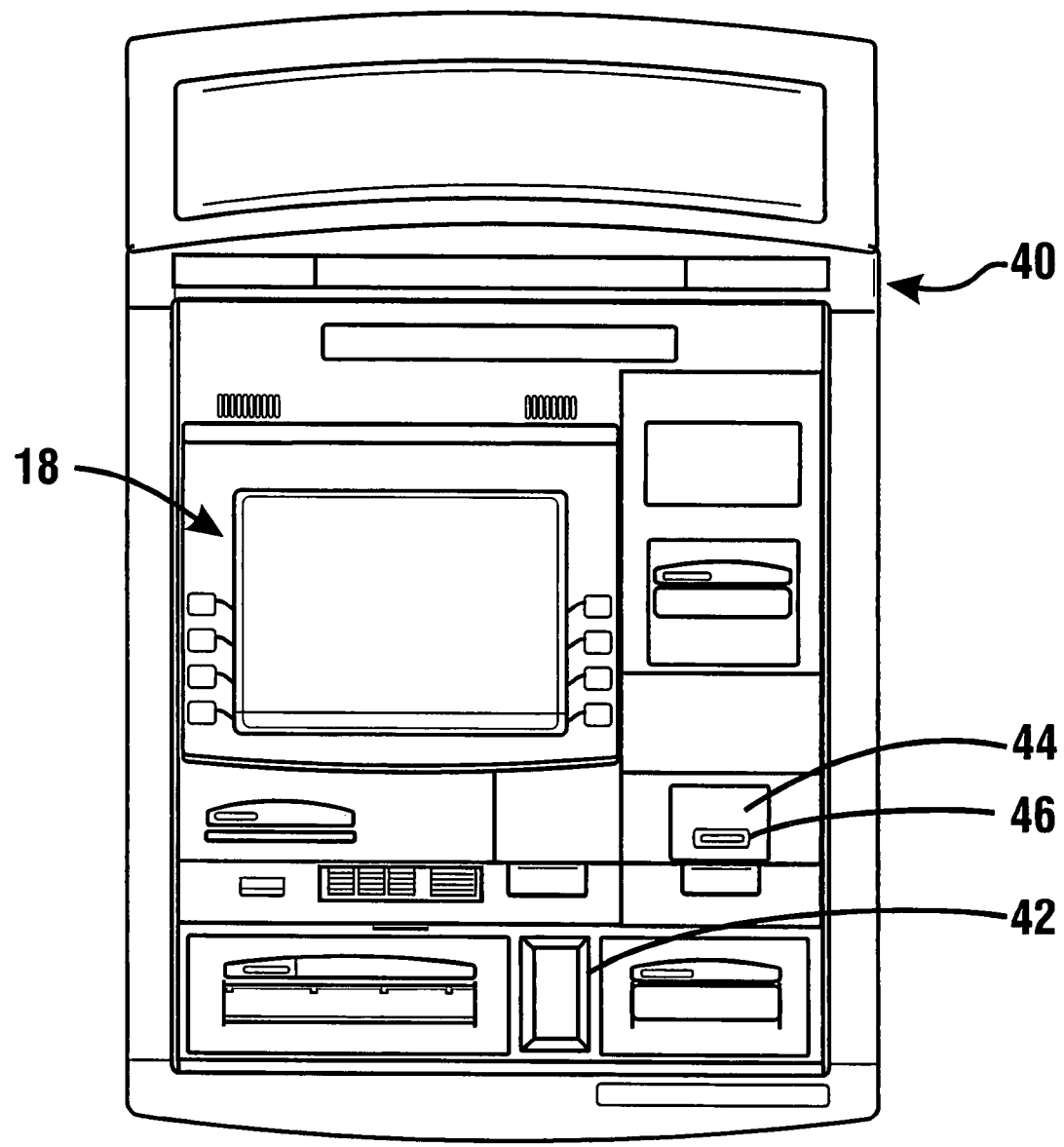
FIG. 3 shows an alternative fascia of an automated banking machine.

FIG. 3 shows an automated banking machine 40 similar to the automated banking machine of FIG. 1. However, the machine fascia 48 is shown with an RFID card reader 42, stamp dispenser 44, and a stamp dispenser outlet 46. In comparing FIGS. 2 and 3, the fascia area previously assigned to a card reader (FIG. 2) is now allocated to a stamp dispenser (FIG. 3). The card reader location was allocated to a lower part of the fascia (FIG. 3).

The ability to use an RFID card reader permits an additional transaction device (e.g., stamp dispenser) to be used at a valuable fascia location instead of a contact type card reader.

That is, the space previously needed for a contact type card reader can now be used by an additional transaction device, such as a stamp dispenser. Likewise, the ability to relocate an existing RFID card reader can also permit use (or relocation) of additional transaction devices. Thus, the use of a non-contact transaction device(s) (e.g., RFID card reader) enables a wide assortment of transaction device arrangements to be implemented with regard to user interface ergonomics.

Figure 4:
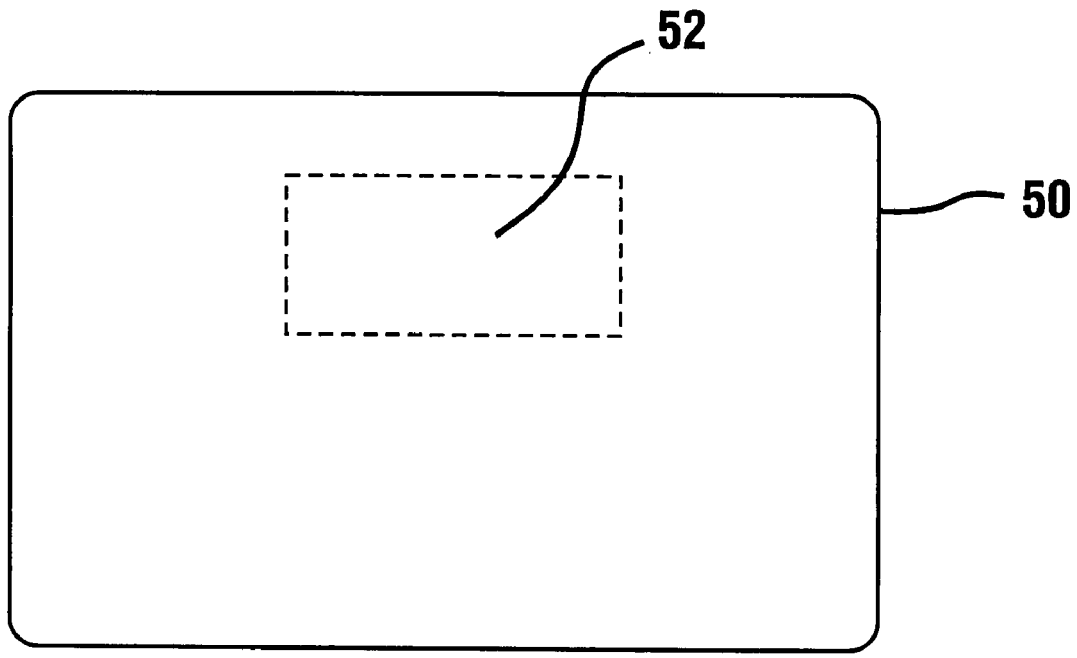
FIG. 4 shows a card including an RFID tag.

FIG. 4 shows a card 50 having an RFID tag 52 embedded therein. The RFID card 50 may also contain conventional card markings and indicia (e.g., raised numbers/letters) thereon. The card may be similar to a conventional ATM banking card or other debit or credit card, except having an RFID tag instead of or in addition to a magnetic stripe.

Figure 5:
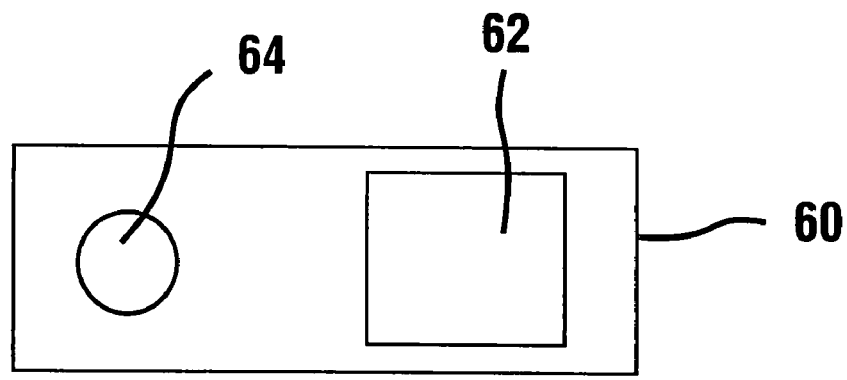
FIG. 5 shows an alternative RFID card.

FIG. 5 shows an RFID card 60 having an RFID tag 62 thereon and a key hole 64. In an exemplary embodiment, a user card only needs to be of a size large enough to hold an RFID data tag (or tags). In comparison to conventional ATM cards, the size of an RFID ATM card can be reduced. For example, an RFID card (as shown in FIG. 5) may be of a size enabling its attachment to a key chain.

A card may have more than one RFID tag. The tags may be of different sizes and include different information. A card may have one or more tags embedded therein and/or one or more tags thereon.

The exemplary RFID cards 50, 60 are usable with the automated banking machines 10, 40 having the RFID card reader devices 16, 42. In such use there may be no need for a customer to insert their RFID card into an ATM machine. Nor does the machine need a card entry slot. Because the user card is not inserted into the ATM, the card cannot be "lost" in a fascia opening (e.g., card entry slot) or the machine. User stress related to fear that their card will not be returned by the machine can be eliminated. Potential users previously reluctant to use an ATM because of such fear can use an ATM without the worry of their card being lost in or captured by the machine. Thus, an ATM using an RFID card/card reader arrangement can be more user friendly. Because an ATM card can remain with the user at all times, the arrangement can also reduce or eliminate fraudulent schemes to trap a card or skim card data. Thus, an ATM using an RFID card/card reader arrangement can also provide enhanced security.

The use of an RFID tag arrangement can permit quicker ATM response time. For example, an ATM can automatically read the tag information, process the information, and prompt the user by name to enter a PIN number. The time previously necessary for the user to correctly insert their card into the ATM and have the card transported to/from the (contact type) card reader can be eliminated. The use of an RFID tag and RFID tag reader arrangement can reduce the average time a user spends at an ATM. Thus, an ATM equipped to read an RFID data tag can increase usage efficiency of the ATM.

In other exemplary arrangements an ATM card can have an RFID tag with a programmable memory. The tag memory is able to store data corresponding to one or more recent account transactions. The ATMs have a writer device for updating the card's tag memory with the latest transaction data (e.g., bank name, cash withdraw amount, and date). The writer may be part of a combined RFID tag reader/writer device. The transaction data can act as a transaction receipt or a series of receipts. The card owner may have a (personal) computer that can wirelessly read the RFID tag to obtain the transaction data from the card memory. The computer can have the transaction data automatically downloaded into a home financial computer program, such as Quicken™. The financial program can apply the transaction data to update the user's account. The ATM writer device can supplement or overwrite the data stored in tag memory. If necessary, the card owner can erase the tag memory after reading the data through operation of their home computer.

In other arrangements which are described in more detail hereinafter, the transaction data in the RFID tag can be automatically read from a distance. For example, a card memory may be read without its removal from its stored location (e.g., a user's wallet or purse). A user may have a smart house in which the RFID memory data can be read by a tag reader and automatically delivered to the user's PC for input to a financial computer program. The structure of a smart house may enable the card memory data to be read upon the owner (with the card) entering the house, and then load the transaction data into the financial program. In alternative embodiments this can be done with a reader attached to the PC and the user bringing the card adjacent the reader at an appropriate time during operation of the financial program.

An ATM RFID data tag may also be inserted onto (or combined with) a typically non-ATM card (e.g., merchant charge card, ID card, drivers license, library card, etc.). The hiding of ATM information in a typically non-ATM card can increase the level of user information security.

Other arrangements can have an ATM RFID data tag on a multi-use card having plural distinct RFID tags. For example, the same card may have several RFID tags, each only usable for a specific purpose. One tag can be an ATM tag which is readable by an ATM, whereas another tag is a fuel purchase tag readable by a fuel pump, whereas a further tag is a credit card tag. Also, a multi-use card may have a generic RFID data tag which is readable by a plurality of RFID reading devices. The generic RFID data tag can include information which can be used in conjunction with data provided by or stored in one or more other tags on the multi-use card.

In certain exemplary RFID card reader arrangements an RFID card can be remotely read without the need to wave or place the card adjacent to or in close proximity of a (ATM) card reader. For example, an RFID card reader can have an increased (e.g., in power) reading range capable of reading an RFID card while the card is still in a wallet/purse.

In alternative arrangements the ATM RFID data tag need not be on/in a card, but may be associated with a non-card item. For example, an RFID tag may be associated with a wallet or purse. The tag could be embedded in the wallet. Other items such as eye glasses, keys, and clothing may also be used to hold (or hide) an RFID tag. The tag may be positioned at any location associated with a customer that enables its reading thereof by an RFID tag reader associated with an automated banking machine.

A vehicle (e.g., an automobile) may also be equipped with an ATM RFID data tag. The RFID tag may be positioned on the auto at any location enabling its reading by an appropriately placed RFID reading device of the ATM. For example, an RFID reading device may be situated to read a tag positioned on a window, minor (e.g., rear view mirror), or license plate of an auto. The ATM can automatically read the tag information as the auto is approaching the ATM fascia, process the information, and prompt the user by name to enter a PIN number. That is, the speed of one or more computers associated with an ATM may be able to present a welcome display screen to a particular named customer prior to (or simultaneously with) that customer actually arriving (or stopping or parking) at the ATM. The use of an ATM RFID data tag on an auto can enhance speed and efficiency of drive-thru ATM banking.

FIG. 6 shows a side view of an exemplary ATM drive-thru arrangement 70. An ATM 74, RFID reading devices 76, 78, and a wall 77 are also shown. FIG. 7 shows a top view of the arrangement of FIG. 6 with the addition of a vehicle 80 in a drive-thru lane 72. The vehicle 80 is approaching the ATM 74. The reading devices 76, 78 are operative to respectively read an RFID tag located in a front or rear view of the vehicle. The reading device 76 is positioned to read a tag from the rear of the vehicle, whereas the reading device 78 is positioned to read a tag from the front of the vehicle. The reading devices are in connection (e.g., wire or wireless connection) with the ATM to provide information thereto.

In other exemplary embodiments, an ATM is able to recognize and prioritize a plurality of customers in a queue via (automatic) reading of their ATM RFID tags. The ATM can create a temporary memory list of users currently awaiting access to the machine. The memory can be stored in a first in first out (FIFO) method. The RFID reader of the ATM can be equipped to automatically read all ATM RFID tags within a predetermined distance of the reader/ATM. For example, the reader may be arranged to obtain (and provide to an ATM processor) information on all users in a queue within ten feet of the ATM.

This information can be used to determine personalized presentations to be made to the particular user once they reach the ATM. This may be done in a manner like that shown in U.S. Pat. No. 7,039,600, the disclosure of which is incorporated herein. Alternatively or in addition, the reader may be arranged to obtain information on a predetermined number of users. For example, the ATM memory may only concurrently hold information on three users. An ATM may also periodically scan for potential users to update the user queue memory. An ATM can be programmed to provide a special display message (e.g., apology, discount information) or dispense a coupon to a user who has waited a predetermined amount of time. Other items or services, either through machine display or through machine dispensing, may also be provided to customers that had a lengthy wait. Such other items or services may further include credits, rebates, tickets, refinance discount, free car wash, currency, special offer, or other form of benefit.

An ATM may also have a user option of canceling a (wrong-named) user who has left the queue subsequent to the latest queue update. That is, if the welcome display screen (which can refer to a particular user name) presented to a user corresponds to the wrong user (e.g., a user who has left the queue without detection by the machine), then the user who currently has access to machine can notify the machine of the situation. For example, the display screen may have an initial user message welcoming a specific user along with a smaller message such as "If you are not the named user then please press the exit button." If the exit button is activated, then the ATM is able to quickly change the welcome screen to the user next listed in the queue memory. In some embodiments the queue data may be rechecked by the ATM scanning for signals of cards in proximity to the machine. Thus, if the RFID signal associated with a particular user is no longer sensed, that user may be eliminated from the queue in ATM memory. One or more ATM computers in operative connection with one or more RFID tag readers can maintain the queue data in real time.

The ability of an automated banking machine (e.g., ATM) to recognize and prioritize a plurality of customers can permit a facility to offer additional customer amenities. A prioritizing automated banking machine can be equipped with speakers and a speech program to enable the machine to announce the name of the next customer granted access to the machine. Of course other features may be used to anonymously identify the next customer. For example, a customer may have the option of selecting a personalized announcement number uniquely corresponding to their card.

A customer waiting area may be provided with seats (e.g., chairs) or tables enabling customers to sit and relax (or perform work) while they temporarily wait. The waiting area may also have a wall mounted display screen that is viewable to the entire waiting area. The automated banking machine can display the name and/or picture of the next customer on the screen. Other methods of notifying the next machine user can also be used. For example, the machine (or the machine's network host) may notify the user via a page or phone call to a cell phone. In other arrangements the waiting area may have computers providing (free) access to the Internet. The ATM can proclaim the next user via the provided Internet computers. In still other arrangements the ATM can notify the next user via their hand-held personal device (e.g., PDA, laptop computer, etc.). Alternative manners of prioritizing ATM usage may take into consideration other factors about the customer. For example, an ATM (or host computer) affiliated with a casino may identify a customer as special (e.g., a "high roller") and grant priority access thereto over other casino customers.

Figure 8:
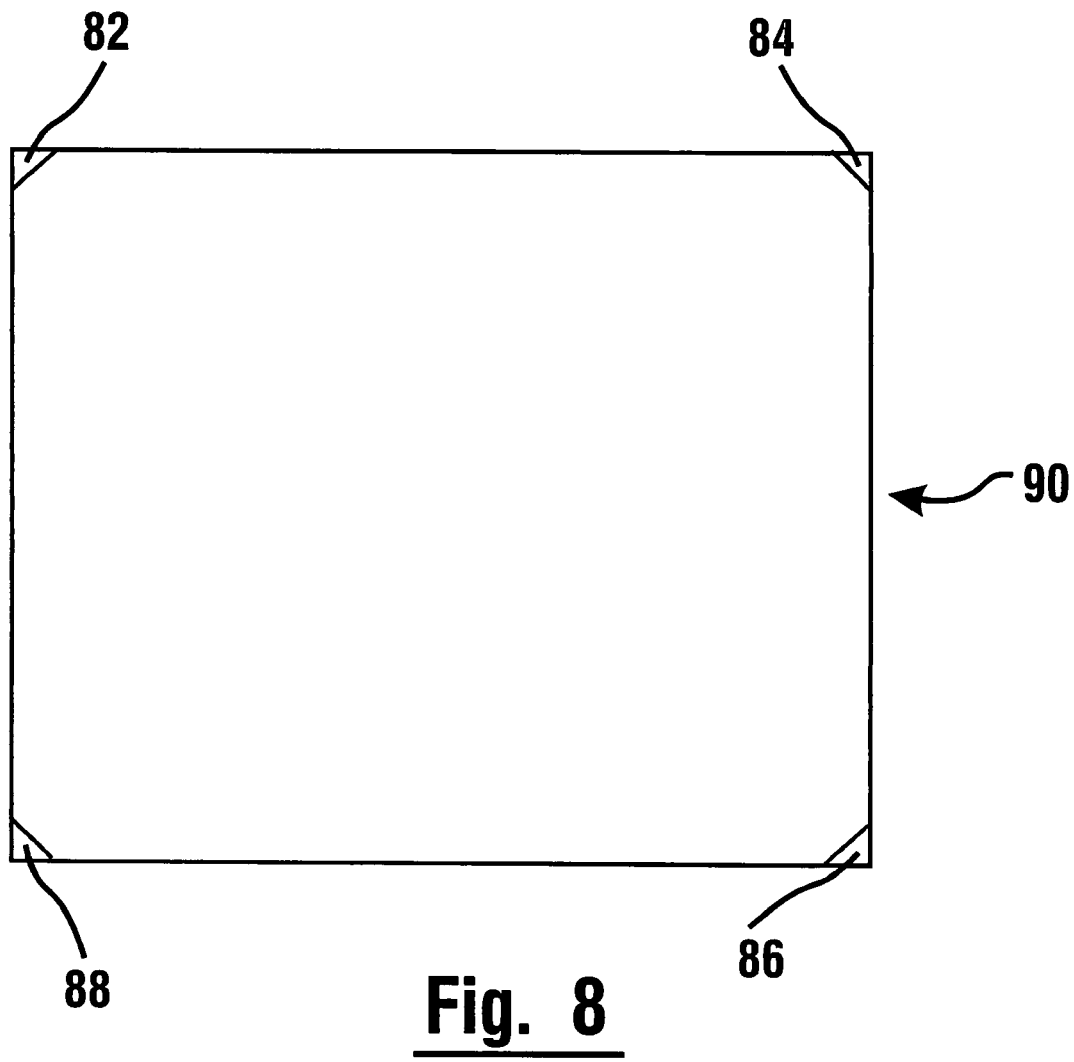
FIG. 8 shows a facility having plural RFID tag reading devices.

In other exemplary embodiments a prioritizing automated banking machine may be used in waiting facilities where many people are normally expected to simultaneously congregate and wait, such as doctors' offices, hair stylist centers, and motor vehicle registration centers (e.g., DMV, BMV). A prioritizing machine may also be provided in a restaurant, such as a fast-food facility. The prioritizing device(s) can be operatively connected to one or more remote tag readers to automatically read all RFID tags in a predetermined area of the waiting facility. For example, the tag readers may be strategically positioned to generally surround the waiting area. FIG. 8 shows a waiting facility 90 having RFID tag reading devices 82, 84, 86, 88 positioned in a surrounding relationship. The reading devices are operatively connected to a prioritizing device (e.g., processor). The reading devices may be sequentially or simultaneously operated.

In an exemplary embodiment, contactless (e.g., wireless) technology can also be used by an automated banking machine to communicate not only with RFID tagged items (e.g., ATM cards), but also with other user devices, such as smart cards, PDAs (personal data assistant), cell phones, pagers, and laptop computers that utilize RF and/or RFID technology to send/receive data.

It should be understood that exemplary embodiments of automated banking machines may include a magnetic stripe reader in addition to RFID readers and/or writers. For example, an automated banking machine can have both an RFID tag reader and a magnetic stripe reader. The RFID tag reader can be combined with or positioned adjacent to the magnetic stripe reader. Such an arrangement enables two different types of cards to be read at generally the same location. The ability of an automated banking machine to read data from different types of data cards can be beneficial to implement the capabilities of reading more types of cards or during a transitional period of switching from magnetic stripe cards to all RFID cards.

An ATM can have a user card input slot (or card reader inlet) for insertion therein of an ATM card by a user of the ATM. The card insertion slot is able to receive both magnetic stripe cards and RFID cards. That is, the slot can be a dual use input opening. The slot can be aligned with a magnetic stripe reading device. The magnetic stripe reader can communicate with the slot via a pathway. The magnetic stripe reading device can include a housing that is able to receive the card therein. The slot can be a fascia opening and/or an entry into the magnetic stripe reader housing. The RFID tag reader can be positioned adjacent to the magnetic stripe reader, either in or out of the housing.

Figure 9:
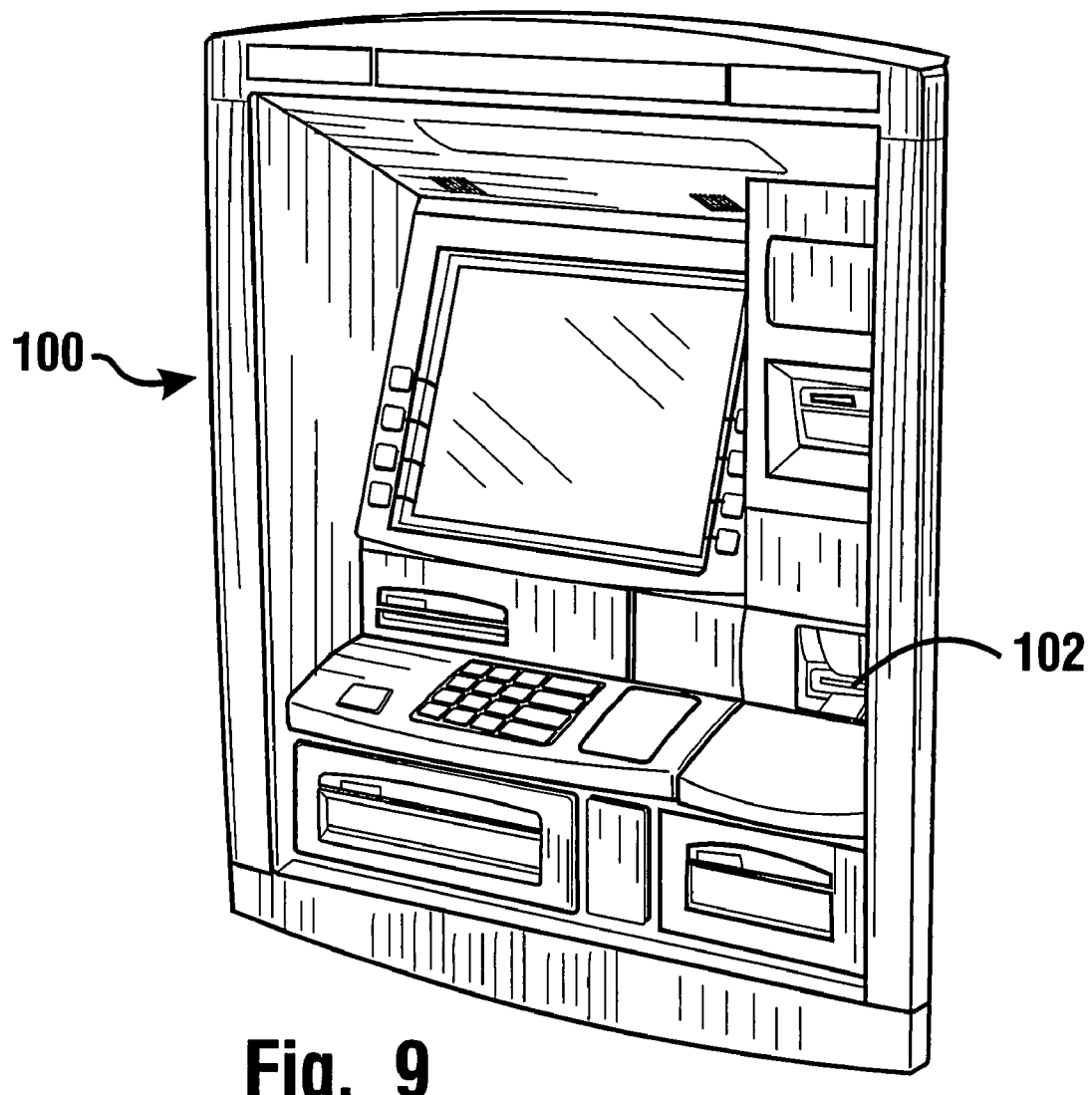
FIG. 9 shows an automated banking machine having a dual use card reader slot.
Figure 10:
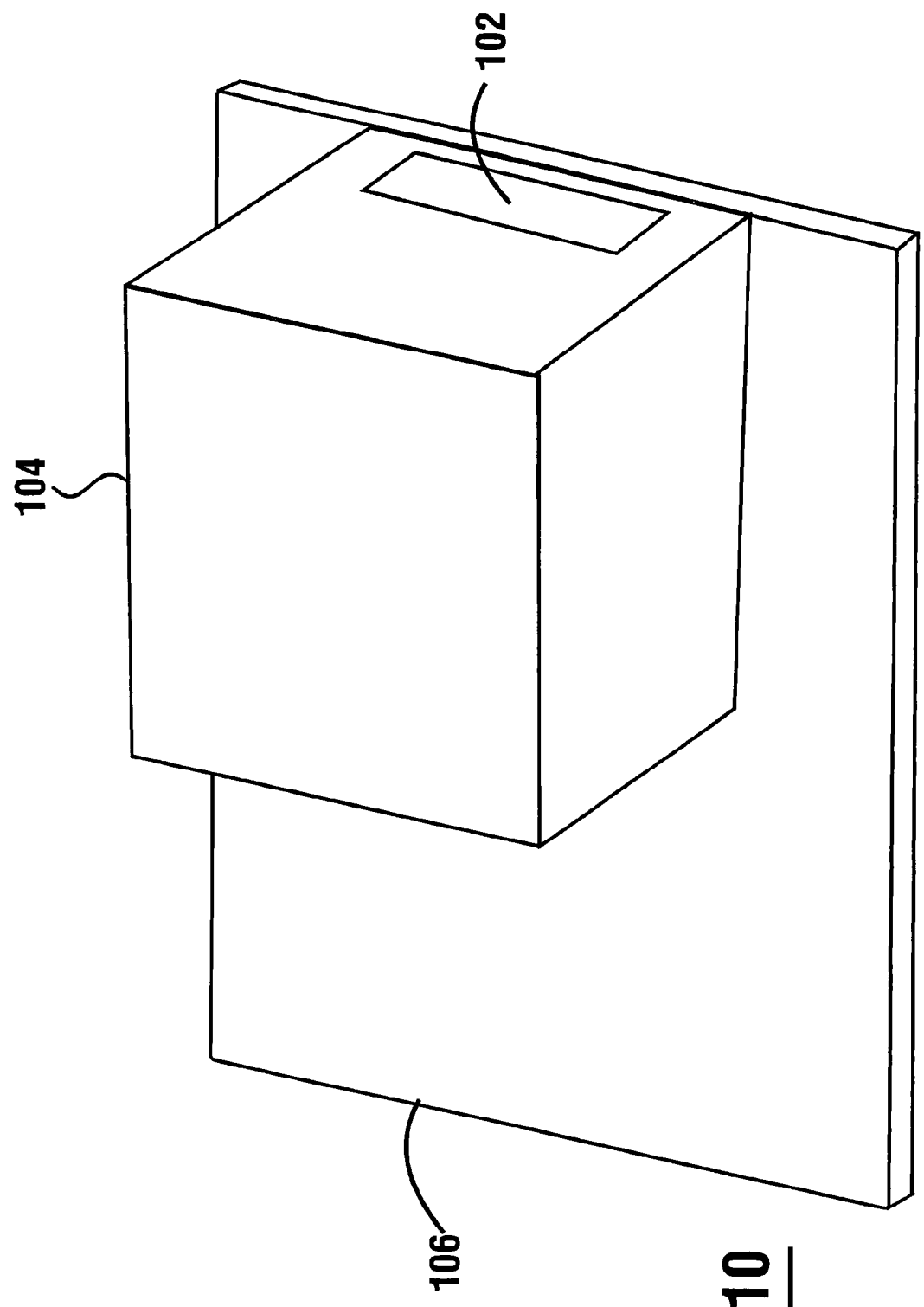
FIG. 10 shows an RFID reader is positioned adjacent to a magnetic stripe reader.

In an exemplary arrangement the RFID reader is positioned outside of the magnetic stripe reader housing. The housing can be of a structure (e.g., open or slotted) and/or of a material (e.g., plastic) that enables the RFID tag to be read exterior of the housing. FIG. 9 shows an automated banking machine 100 having a user card insertion slot 102 into which both magnetic stripe and RFID user cards can be inserted for reading by the machine. FIG. 10 shows cut away angled view of the card insertion slot 102 in relation to a magnetic stripe reader housing 104. An RFID reader 106 is positioned adjacent to the magnetic stripe reader housing 104 in the automated banking machine 100.

The card reading processes can be prioritized based on programming associated with one or more controllers in the automated banking machine. For example, the RFID tag reader can be controlled to operate first in attempting to read a card. Upon a successful read by the RFID reader, the magnetic stripe reader is not active. However, if the RFID reader's attempted read was unsuccessful, then the magnetic stripe reader is operated in a second attempt to read the card. If the second attempt is unsuccessful, then the card is returned to the user. In another reading program, the magnetic stripe reader can be operated first and the RFID reader second. In other card reading processes the magnetic stripe reader and the RFID reader can both be simultaneously operated to read a card.

In other exemplary embodiments the RFID reader may be positioned adjacent to the read head or other magnetic stripe reading device. In such embodiments the RFID tag and magnetic stripe data may be read generally simultaneously. Alternatively or in addition, the RFID data may be read as data is read from a chip on a smart card. Of course, these approaches are exemplary.

In some embodiments it may be advantageous to read the RFID data from the card while the card is within the machine. In such machines it may be advisable to insulate the interior of the machine and/or the reader with RF signal blocking materials (for example conductive elastomers), such that RFID signals read from the card cannot be intercepted by unauthorized reading devices attached to or near the machine. Likewise such capabilities may be used to prevent interception of data being programmed onto an RFID tag. In addition or in the alternative, the fascia of the machine may include intrusion sensors adapted to sense radiation output by unauthorized RFID reading devices attached to the outside of the machine. The controller of the machine may be programmed responsive to detecting potential unauthorized RFID sensor signals to analyze the nature of the signals to determine if they correspond to those likely associated with an unauthorized reading device. The sensing of unauthorized reading devices, for example, is shown in U.S. patent application Ser. No. 10/601,813 filed Jun. 23, 2003, the disclosure of which is incorporated herein by reference.

In response to determining that such signals correspond to an unauthorized reading device, the controller may cause the machine to take actions in accordance with its programming. Such actions may include, for example, stopping operation of all or certain operations of the machine, such as cash dispensing operations. Actions may also include capturing a card from which data may have been intercepted. Actions may also include capturing image data from a camera. This may be accomplished, for example, in the manner shown in U.S. patent application Ser. No. 09/991,748 filed Nov. 23, 2001, the disclosure of which is incorporated herein by reference. Alternatively, such actions may include giving notice to a remote entity in a manner such as is done in U.S. Pat. No. 6,768,975, the disclosure of which is incorporated herein by reference. The controller may also be operative to cause an emitter to output signals that are operative to jam, saturate or provide false data to an unauthorized RFID reading device. Of course, these actions are exemplary of actions that may be taken.

In some exemplary embodiments the data from an RFID tag may be used to authenticate other data on a user card or other item or feature used to operate an ATM. For example, data recoverable from memory on an RFID tag may be used to verify data recoverable from another source, such as a stripe or a chip on a card. For example, data read as part of RFID data may have a corresponding or other predetermined relationship to all or portions of magnetic stripe data, chip data, and/or customer input data. The presence of such a relationship can be determined through programmed operation of one or more controllers operating in the ATM. The determination that the relationship is present for the particular card or transaction may be used to provide greater assurance that the card is genuine and/or that data on the card has not been tampered with.

In some embodiments RFID tags can be embedded in cards or other items. In other embodiments an RFID tag may be attached to items. For example, a customer may be provided with a thin RFID tag that includes self adhesive material. The user may be provided by a card issuer, bank, or other entity with the RFID tag and given instructions to apply it to an associated magnetic stripe or other card. Data readable from the RFID tag can then be read by the ATM when the card is used, and such data compared to magnetic stripe and/or customer input data, or portions or combinations thereof for a determined relationship. The existence of the relationship serves to reduce the risk that the input card is genuine and is not a fraudulently produced duplicate card. The existence of the predetermined relationship can be required by the controller in accordance with its programming before ATM transactions, such as dispensing cash, can be conducted at the ATM.

In some embodiments the card issuer may provide replacement or additional self adhesive RFID tags to a card holder. The card holder may remove the existing RFID tag from the card and replace it with the new tag. The new tag may have different or additional data that can be utilized at the ATM controller to authenticate the card, the user, or other data, in another manner. ATMs may be programmed such that if the original tag is not replaced with the replacement tag, the card will no longer operate the ATM. Alternatively, the additional tag may need to be applied to the card while the first tag remains. The ATM controller may use data from both tags in the determination that the card should be accepted and the ATM operated to carry out one or more transaction functions.

Of course, these approaches are exemplary of approaches that may be used. Further, while the exemplary embodiment is used in conjunction with an ATM, it should be understood that similar principles may be used in conjunction with other credit card terminals, debit card terminals, vending devices, and other devices that employ such cards for operation.

In still other embodiments an issuer of a card may provide a user with an RFID tag or other item that is not attached to or connected with the card. For example, the user may be provided with an item that includes an RFID tag that the user will always be expected to be carrying when the user conducts ATM transactions. This may include an item such as a card holding sleeve that the user can keep in a wallet, a tag that can be attached to a key ring, or a self adhesive label a user can attach to a key, watch, wallet, pen, jewelry or other item generally carried by the user. When the user conducts a transaction at the ATM, a reader in or operatively connected with the ATM reads RFID data from items in proximity to the ATM. If the proper RFID data is not detected, the ATM will not operate to perform at least some transactions. Thus even if a user's card data, card, and/or PIN has been taken by a criminal, the criminal may be prevented from accessing the user's account if the user does not have the personal item bearing the RFID data. Of course this approach is exemplary and in some embodiments other approaches may be used.

Further in some embodiments RFID tag data may include data usable for verifying the origin and/or authenticity of data or messages. For example, RFID data may include digital signatures and/or digital certificates. Such digital signatures and digital certificates could be used to authenticate data input via a card or through an input device, and/or could be used to authenticate a message originating from an ATM or other device and/or to verify the authenticity of data. Digital signatures and certificates can be used in ways similar to those described in the incorporated disclosures to verify the source of messages, to encrypt and decrypt data, and to configure an ATM. In some embodiments signature and/or certificate data may be wholly stored in an RFID memory, while in others only portions of such data, or data than can be used to resolve such signature or certificate data, can be stored in memory associated with an RFID source.

In other embodiments, data stored in connection with an RFID tag can be used to verify authenticity of a card and/or a user. For example, as previously discussed, a card issuer may provide a user with an RFID tag containing data. Such a tag may be a self adhesive tag to attach to the card or otherwise. Such a tag may include data that can be used by a controller in the machine to verify stripe or other card or user input data (PIN, biometric input, or other input, for example). Alternatively or in addition, the tag may have associated memory included therewith that includes data that can be used by the ATM to verify that the user is the authorized user of the card.

For example, the RFID tag may have stored thereon several items of information that only the authorized user is likely to readily know. These might include, for example, the last digit of the user's Social Security number, year of birth, first digit in residence address, first letter of street on which the user lives, first letter of mother's maiden name, first letter of mother's first name, first letter in father's first name, and other similar data. ATMs may be programmed to ask a customer a random (or in a predetermined order) one of these questions when a transaction session is initiated or at another time in a transaction session at the ATM. The input of the customer in response to the question is compared through operation of the controller in the ATM to the data read from the RFID tag. Only if the input data corresponds is the customer permitted to conduct a transaction or a selected transaction function.

In the exemplary approach, even if a customer's magnetic stripe data and PIN have been intercepted by a criminal, the criminal does not obtain sufficient information to use the card to conduct ATM transactions. In addition, even if the user's input in response to a question presented in response to one random question output by an ATM is intercepted, it has no value unless the criminal has been able to steal the card with the RFID tag or otherwise obtain the separate tag. Further, even if the criminal has the original RFID tag, because the exemplary ATM has a controller that is programmed to output the numerous questions randomly, the customer's response that a criminal has been able to observe is not likely to be the correct response when the criminal presents the card at an ATM. Further, because the ATM can be programmed to capture the card in response to a set number of incorrect responses by a user, there is a significant chance the card will be captured and invalidated by an ATM before the criminal may use it in carrying out a transaction.

Similar approaches may be used with programmable RFID tags. In an exemplary approach, rather than having numerous possible answers to questions selected randomly stored in connection with the RFID tag, the RFID tag memory can be selectively programmed with data the customer may input through input devices on the ATM. For example, the ATM controller may be programmed to advise the customer that the time after the next time (or at some other later time) when the customer uses the card the customer will be asked to input particular data. This might be, for example, the first letter of the user's mother's first name. Data corresponding to the question and/or appropriate response would be input by the user to the ATM and be stored on the RFID tag through operation of the controller and RFID tag writer device. In an exemplary embodiment, the user can provide the question, answer, and/or a code for storage on the RFID tag. Then when the card is used on the corresponding subsequent occasion, the controller in the ATM would operate to present the question and verify the answer input by the user based on the RFID data, and enable at least one transaction or function with the ATM in response to receiving the correct input. Thus, even if a criminal stole the card, RFID tag (if separate from the card), PIN and the response given by the user, the criminal could not conduct a transaction at the ATM with the card, because the criminal would not know the correct response to the question the ATM would pose upon the next transaction (because it was input by the user during a prior transaction the criminal did not observe). Of course, this approach is merely exemplary.

It should be mentioned that some of these exemplary embodiments for verifying a user and/or a card or other item may be carried out locally at the ATM. This may avoid the need to modify the nature of transaction messages transmitted to and from the ATM in a financial network to carry out transactions. Of course other embodiments may use remote communication to facilitate secure operation. For example, a remote computer (connected to a data store) may provide one or more values or codes that are stored in RFID data. Such data (which may be in a card) may be looked for or used the next time the card is used, and its absence or variation identified to indicate a false or stolen card. Of course this approach is merely exemplary.

In alternative embodiments a user may be provided with a RFID tag that a user can install in or attach to an item such as a PDA with wireless communication capabilities or a cell phone. The PDA or cell phone associated RFID data may be read to initiate a transaction or a particular function at an ATM. For example, the RFID data may include data usually found on a card that corresponds to a user or user's account.

The ATM controller may be programmed to prompt the user after reading the RFID data to provide an input through the PDA or cell phone. For example, the ATM display could prompt the cell phone user to call a number associated with the ATM or a remote computer. The telephone connection could prompt the user to input the user's PIN through the cell phone. This could be used to reduce the risk of interception. Alternatively, the user could be instructed to change the user's usual PIN in a particular way for this transaction. For example, the user might be told via the phone connection to substitute a particular digit or symbol for the usual first PIN digit. The user would then input the modified PIN through the ATM, and the ATM would carry out the transaction. If a PDA is used, communication could be conducted wirelessly between the PDA and ATM such as through Bluetooth® or other wireless communication. As can be appreciated, because the acceptable PIN could be varied with each transaction, a criminal observer of the input PIN would not have the user's actual PIN and the ability to conduct a transaction at an ATM.

Further, this exemplary approach could be combined with other approaches previously described to provide enhanced security. Of course these approaches are exemplary of many approaches that may be used.

An exemplary automated banking machine also has the ability to read non-card RFID devices. These RFID tags can be embedded in or associated with transaction items such as currency (e.g., bills and coins), checks, securities, account passbooks, certificates of deposit, tickets, coupons, gift certificates, etc. Documents such as present and next generation currency (e.g., plastic bills and plastic coins) can contain RFID tags. An RFID tag associated with a currency note can hold a plurality of information representative of the note, including but not limited to the note's value (e.g., $50), serial number, and issue date. The ATM can have an RFID tag reader that can read the note's RFID tag information. The ATM can also read the note's value, serial number, and issue date from one or more surfaces (faces) of the note. The ATM can perform a note validation process based on the read information. The note validation process can include checking whether the note face information read directly from the note matches the note face information read from the RFID tag. In alternative validation arrangements, the two sets of read note face information can be transmitted from the ATM to an ATM network host where the note validation process can be carried out.

Furthermore, the ATM or an ATM host or one or more remote computers or networks can transmit bank note validation information to a central processor arranged outside of the banking network in order to have the note validation process performed. The central processor can constitute one or more connected computers that comprise a main or central computer that maintains a data store containing data on all new (e.g., U.S.) currency bills. The data store includes note face information corresponding to particular RFID tag ID numbers and/or other data. The main computer may be a government (e.g., Treasury Department or Federal Reserve) computer.

In an example of a verification process, a bank note is received by an ATM in an attempted deposit transaction. The note has an RFID tag that only includes a tag ID number. The RFID tag can be non-programmable. Thus, the ID number is permanently assigned to that note. The ATM reads the note's face information. The ATM uses an RFID document tag reader to read the tag's ID number. The ATM gives the ID number (along with the information read from the face of the note) to the ATM host. The host passes the ID number and the note face information to the main computer. The main computer uses the ID number to obtain the note face information corresponding to that particular ID number from the data store. The main computer then compares the two sets of note face information to determine whether the note is valid. The main computer informs the ATM host on the determined validity of the particular note. The host can then instruct the ATM on whether to deposit, hold as suspicious, or return the note.

The use of RFID tags in currency permits tracking (or at least partial tracking) of currency. Tags can be used to track the flow of money into and out of a banking network. For example, a banking network can use RFID tagged currency notes to monitor the activity of individual currency notes within the network. The monitoring can be used to enhance cash management. Cash can be reallocated to segments of the network in order to maintain a proper balance or to prevent a cash shortage situation. A network database can be used to store currency note inventory data. The database can be used to track the currency notes received into the banking network (e.g., deposits into ATMs, etc.) and the currency notes that have been removed from the banking network (e.g., ATM cash withdrawals, etc.). The inventory tracking may be carried out in real time. On a broader scale, the governmental main computer can be in communication with a plurality of banking network databases to access a real time inventory of cash over a wide segment of the banking industry. The main computer can be used by the Federal Reserve to reallocate cash throughout the different Federal Reserve regions.

The main computer can also be used to track currency for research. For example, the main computer can attempt to follow a currency note throughout its life cycle. The life of a currency note may include its creation at a mint, distribution by the Federal Reserve, passage through several banking systems, and multiple uses at several ATMs. The tracking can be used in note travel analysis.

The tracking can also be used in detecting counterfeit currency, such as when a non existing serial number is detected or when two of the same serial numbers are detected in questionable situations. For example, a serial number read on the Eastern coast of the U.S. two hours after having been read on the Western coast would create a questionable situation.

RFID tags in currency can also be used in statistical analysis to calculate or create normal patterns of currency deposit/withdrawal. A pattern may include several factors, including a total deposit amount over a predetermined time period. A normal deposit pattern can be assigned to an individual ATM, a specific number of ATMs, and/or an entire network of ATMs. Patterns involving segments of an ATM network may also overlap. A normal deposit pattern can be created after performing a lengthy study (via RFID tags on currency) of deposits made to the ATMs assigned to the pattern's particular coverage area. For example, the pattern factor comprising the normal range of deposits per time period is calculated and assigned to that particular pattern. A pattern can be continually adjusted to compensate for different business activities (e.g., new housing) occurring within the pattern area.

The monitoring of deposit patterns (via RFID tags in currency) can be used to ascertain questionable deposit activity. The monitoring may be carried out in real time or near real time. In a pattern monitoring example, the pattern of currency entering an ATM network is compared to the normal deposit pattern for that network. A discovery is made that the current deposit pattern differs from the norm by an unacceptable range (e.g., 25%). The non normal pattern may be the result of an unusually large amount of currency having been deposited into several network ATMs within a relatively short period of time. Deposit patterns out of the norm are automatically flagged and may be investigated for illegal activity, such as money laundering. The previously discussed ability to use RFID tags to track deposited currency to a particular customer at a particular time can be used in the review of the flagged pattern to determine whether the deposit transactions were legitimate.

Other uses of currency with an RFID tag may also be used in exemplary embodiments. For example, an RFID tag with a programmable memory can be used to enhance the security of bank notes in an ATM. The ATM can operate an RFID writer to reprogram the RFID tag to change the status of currency between first and second identifier states (e.g., active and passive states). For example, a tag in a passive or non flagged state may represent that the currency note was legally dispensed and is valid for public usage. A tag in an active or flagged state represents that the currency note is (or should be) under the jurisdiction (or current possession or ownership) of a particular entity or financial organization, such as a bank. An active note outside of the bank's currency system is an indication that the note was taken without permission (e.g., stolen) from the bank, such as via breaking into an ATM or during transport. Currency can be deactivated during its dispense from an ATM. Currency can be activated during its reception as a proper deposit. Active/passive (e.g., bank/public) in an RFID tag memory can be represented by identifiers or codes (e.g, numbers, letters, etc.). Of course this approach is merely exemplary.

The use of active and passive tags can prevent the laundering of a stolen note back into the banking system, such as via a deposit into an ATM. An ATM of the banking system can read the RFID tag of a note that is trying to be deposited, identify the note as active (suspicious or stolen), and notify the proper authorities of the situation. Of course on a broader scale a banking system may be linked with other banking systems to share RFID tag information. Each bank may have a unique bank code that is represented in their active state of a tag. Each bank system can recognize not only their own currency but also that currency belonging to other banks via reading the bank code. A note without a tag may not be accepted for deposit. The serial number of a non-tagged note may be checked via a data store to determine if the note previously had a tag. A non-tagged note may be an indication that the tag was purposely removed or the note is counterfeit. Such tags may also be used to identify the particular individuals associated with transfers of particular bills.

In other programmable RFID tag arrangements a tag can be embedded in specialized currency. For example, programmable tags may be used in newly minted limited edition currency, large bills, or large securities. The tag can store an owner-chosen or other type data such as an encrypted PIN. The PIN may serve as an additional security feature to verify that the current possessor is the actual legal owner. Only specific entities (e.g., banks, security dealers) may have access to the authorized readers that are necessary to decrypt and read a PIN. A provided or entered PIN can be compared with the PIN stored in the RFID tag of the bill or security. Upon ownership transfer of a security, the PIN can be changed by the new owner.

The capability of an automated banking machine (e.g., ATM) to use an RFID tag to recognize an individual item and associate the particular item to a particular customer/account can also be applied to financial checks. A check may include an RFID tag. The check's RFID tag can be programmable. A check's RFID tag can initially contain information representative of the maker's name, account number, and bank name. As previously discussed, the ATM can have an RFID tag reader/writer. The ATM can add information to the tag, modify the tag, or reprogram the tag. For example, additional information that may be added to the tag by the ATM may include the check amount, date, payor, payee, transmitting bank, routing number, and/or bank account or other data or numbers. The ATM prepares the tag memory so that all the necessary information is available in the RFID tag to allow the Federal Reserve to read the tag and process (clear) the check.

In an exemplary embodiment the component modules/devices (e.g., input and output devices) inside of an automated banking machine use contactless (e.g., wireless) processes to communicate with each other and/or to the machine's internal computer(s). The internal ATM controller(s) can serve as a local host computer to each of the components in the machine. It should also be understood that the local host computer can also constitute a machine component. As previously discussed, automated banking machine components may include (but are not limited to) transaction function devices such as any of a card reader, keypad, function keys, display, receipt printer, journal printer, account statement printer, currency dispenser, and currency acceptor. Wireless communication can be used to make the individual components independent of any hard-wired signal communication relying on wiring or distribution hubs. That is, the components can have wireless communication that is not dependent on any fixed hard wiring between components. Interface hub wiring (e.g., USB hubs) for multiple device interfaces can be reduced or eliminated.

A wireless communication arrangement frees up additional room inside of a machine housing and makes component placement more flexible. Thus, additional functionality and/or more devices/components can be added to an ATM. The number of module/device interfaces and locations can be increased in the ATM. The number of devices is not limited by the number of individual hard-wired signal/communication wires, distribution hubs, or their physical locations inside the ATM. Some components that do not have to be located adjacent a fascia opening may be randomly positioned in the machine, due to their exact position being irrelevant. Troubleshooting, component/machine downtime, and replacement of faulty hard wiring associated with communication wiring between the ATM's internal computer and a component can also be reduced or eliminated. Power supply to devices can also be provided in some embodiments by providing RF energy within the housing from one or more emitters. Multiple transaction function devices may receive power from the RF emitter(s) as necessary for operation and/or communication.

A wireless communication arrangement may also be used to add an additional layer of security to an ATM by reducing the opportunity to tamper with an ATM and/or its components. Elimination of component hard-wiring removes the ability of a person to physically alter wiring to provide unauthorized access to the ATM banking network and/or to control an ATM component. With the absence of wiring, then any capacity to bypass original hard wiring with false wiring between a local host computer and the components for the purpose of overriding original programming has been eradicated.

Communication among the components and the host computer can utilize encryption codes as an additional security layer. Likewise, communication involving an RFID device can be encrypted. The encryption codes can be utilized as an additional security layer in sensing, indicating, and/or reporting when suspected tampering is occurring.

A component's RFID device can be activated by another component (or an RFID device of that component) during an attempt to communicate. When activated the RFID device can automatically power up its component in order to receive data and/or transmit requested data. A component can be arranged such that it is only powered up (i.e., "on") when its RFID device is in an active state. An RFID device can also be used to automatically power down its component upon an instruction (e.g., deactivation signal) or during absence of activity. Power consumption of a component can be reduced by installing a "sleep" mode in the component.

The ATM housing can be shielded with RF blocking materials to prevent interference, interception, or outside manipulation of the communications among the components and the host computer. A shielding structure may include conductive elastomer.

Figure 11:
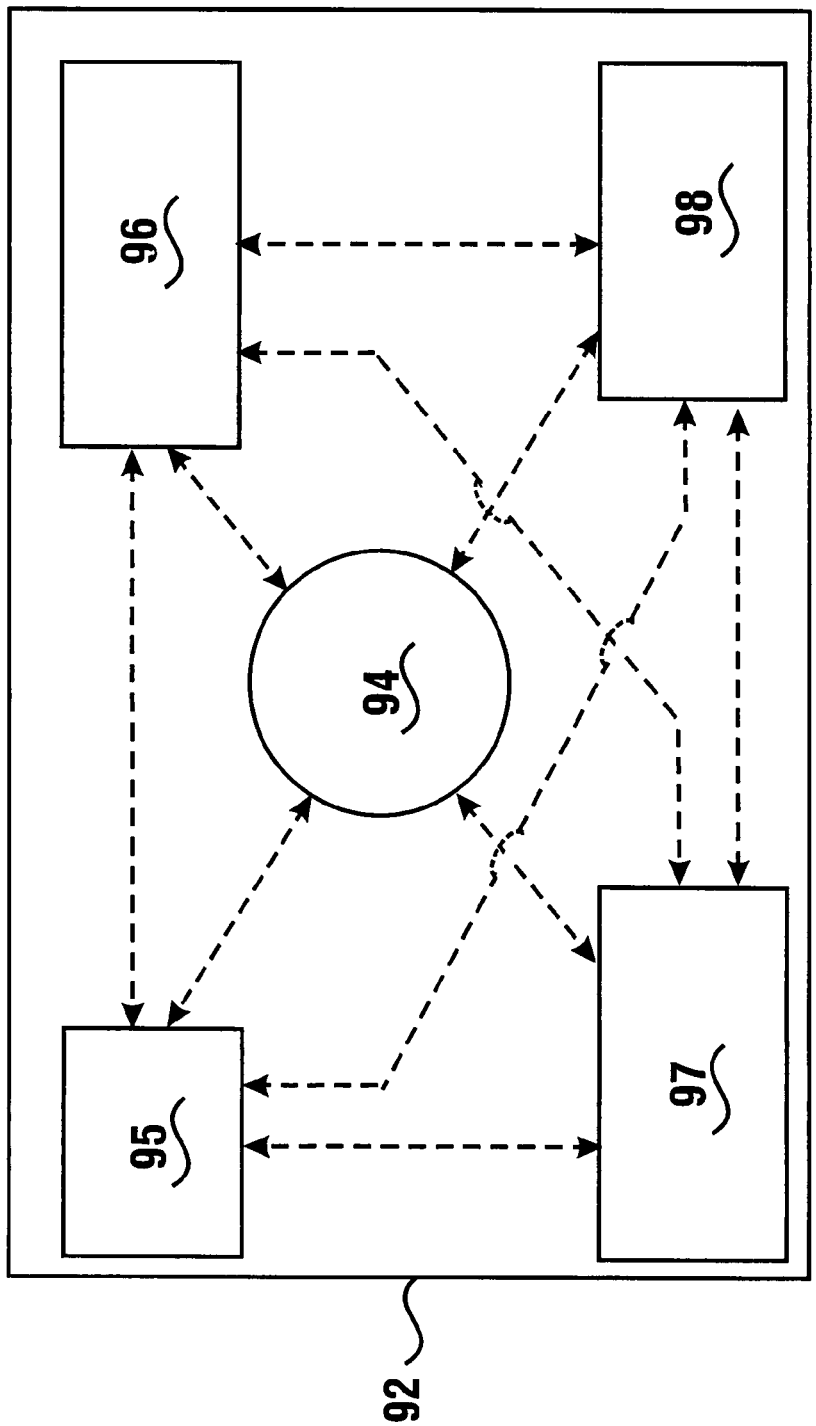
FIG. 11 shows an interior portion of an automated banking machine with components arranged in wireless communication.

FIG. 11 shows a rear view of components and a local host computer 94 arranged in an interior portion of an ATM 92. The components and local host computer are devoid of wired communication with each other, but can communicate with each other wirelessly. Components such as a card reader 95, display 96, currency dispenser 97, and currency acceptor 98 are shown.

As previously discussed, the use of RF can eliminate mechanical contact between cards and card readers. Of course the use of radio frequency is one example of non-contacting remote communication. It should be understood that other types of non-contacting information communication may be used in other exemplary embodiments instead of (or in additional to) radio frequency or radio waves.

In another exemplary embodiment, a user card can be replaced by a hand-held mobile device. The user card data (or information) is stored electronically within the mobile device. The process replaces user card insertion at an automated banking machine (e.g., ATM, self-service machine, etc.). The mobile device/ATM relational arrangement sets forth a secure mode of providing data normally found on a user card to an ATM. The user card data may include any of a personal account number (PAN), a card verification value (CVV), a customer name, a bank identifier number (BIN), etc. The mobile device (or portable device) may include a portable computing device. The mobile device can comprise a phone (e.g., a cell phone), personal digital assistant (PDA), notebook computer, Blackberry device, BlueTooth device, Ipod device, a mobile communication device, etc.

The card information can be used to carry out transactions at mobile device-compliant ATMs, including cash withdraw transactions and other services. The arrangement enables an ATM user to provide card data needed to perform a transaction, yet without use of a tangible card. As a result, ATM customers can be protected from card-related ATM frauds, such as card reader skimmers. The arrangement reduces the effectiveness of card skimming devices by allowing input of card data without card insertion.

Instead of inserting a card at an ATM and using a conventional magnetic stripe card reader, a customer can start a transaction by pressing an "Enter" key (or some other designated key or keys) located on a user interface of the ATM. The ATM (or ATM host) includes one or more software applications. The software can cause a time-variant random code (or random number) to be generated in response to the designated key being activated.

It should be understood that a third party random number generator or some other remotely located entity computer can be used to generate and provide a random code to an ATM (or ATM host). A random code provider can be placed in operative connection (such as via the Internet) with the ATM (or the ATM's host) to supply the ATM with generated codes. Although generation of random code at the ATM level may be discussed in more detail herein for reasons of brevity, it should be understood that distinct suppliers of random code can instead be used.

A random code may consist of plural digits, such as four digits. The digits can be numbers and/or letters. It should be understood that fewer or greater digits than four may be used in forming a randomly generated code. The ATM (or ATM host) software can also cause the ATM to visibly display the randomly generated code on a display screen. The display enables the code to be viewed by a user of the ATM (e.g., the user that pressed the designated key).

The mobile device includes one or more software applications. A registered user can download the software onto their mobile device from a secure web site. One of the applications includes data encryption software that enables a related data decryption software application of the ATM (or ATM host computer) to decipher the encrypted data.

The mobile device includes memory for storing card data (e.g., PAN, CVV, BIN, user name) of several individual cards. The mobile device can also retrieve the card data from memory storage. The mobile device can function like an electronic wallet. A user can select from any of the cards to use its corresponding card data in a transaction with an ATM. For each card stored on the phone, the electronic data provided to an ATM can comprise the Track-2 data normally found on the magnetic stripe of the physical card.

The user enters the random code displayed by the ATM into the mobile device and selects one of the stored cards. For example, the code can be manually entered. The mobile device software can follow an encryption pattern to generate an encryption that includes both the code data and the selected card's data (e.g., PAN, CVV).

The process of encrypting can be independent of the code. That is, the code can be merely additional data that is encrypted in the process. Also, as discussed in more detail later, in alternative arrangements the code can be left out of the encryption. Conventional encryption/decryption processes and arrangements are well known.

The software program causes the mobile device to display the encrypted data as an image on its display screen. For example, the encrypted image can be displayed in the form of machine-readable data, such as a (two dimensional) bar code. Display screen types and formats are well known, including LCD, plasma display, etc.

The ATM includes a reader device that can read the encrypted image. For example, the image reader may comprise a bar code reader. The reader device is mounted in a position that enables an ATM user to locate their mobile device adjacent thereto. The image reader may replace an existing magnetic stripe card reader.

The ATM may prompt the user (via the ATM display screen) to place the displayed encrypted image near the image reader. The ATM may also prompt the user to press another designated ATM key when the image is properly positioned near the image reader. Upon detection of the key activation, the image reader is operated to scan for an encrypted image.

The ATM (or host) software knows the encryption pattern, enabling the encrypted image to be decrypted. The bar code may be converted to a different data format prior to decryption. The encrypted image format or encrypted data format can be analyzed to determine if it is genuine and/or valid (e.g., if it was created using a corresponding encryption software program). The analysis may include determining if the received data is readable, recognizable, or properly formatted. For example, expected fields in the encryption may be missing or contain values out of range, indicating invalid properties that prevent proper decryption. As a result, the ATM may again attempt to read and analyze the (expected) bar code image or void the transaction. Valid encrypted data enables decryption thereof.

It should be understood that the analysis of data may first occur after decryption. Alternatively, a decrypted data analysis can be performed following an initial analysis of encrypted data.

After obtaining valid decrypted data, then the random code can be checked by the ATM (or host) for verification. The ATM (or host) knows the code that was generated for and correlated with the current transaction session. The decrypted code can be compared with the generated code. If they do not match, then the transaction can be canceled or other action taken.

The time-variant random code has a finite useful life. For example, each generated code may be useable for only a predetermined time period (e.g., 1, 2, 3, 4, or 5 minutes) following creation, after which period it expires. Alternatively, a generated code may be correlated with a set time/date after which it is no longer valid.

If the decrypted code and generated code match, then a further check can be made by the ATM (or host) to determine if that code's life has expired. If a valid (matched) code is still active (alive), then the decrypted card data (e.g., PAN, CVV)

can be used to continue the transaction. Using a time-variant code ensures that the user is the current transaction user. A random number can be used to verify that the ATM user corresponds to the current transaction session. A thief can be prevented from trying to fraudulently use data directed to a prior transaction session.

The encrypted image can be read at an ATM, the data in the image converted (decrypted) into a text format, and then the text written to a file. The Track-2 data can be extracted from the file. The derived Track-2 data is copied to (and updates) the ATM's Track-2 (card data) buffer.

The arrangement enables an ATM to receive user card data in a more secure manner. From the view of the ATM, whether the card data was received via a mobile device or via a magnetic stripe, the resulting content and format of the data in the Track-2 buffer would be indistinguishable.

Upon having the needed card data, the ATM transaction process can follow the routine path. That is, the ATM is advanced to the next state (e.g., PIN entry) in the transaction. For example, a subsequent stage in the transaction can include user PIN entry. The mobile device user can (manually) input their PIN at the ATM's user interface. A conventional PIN verification process can be carried out. If the PIN is valid, then the transaction can be further continued.

The arrangement also enables user card data entry to conventionally occur prior to user PIN entry and verification. Thus, the arrangement does not interfere with the normal flow (order) of an ATM transaction or with a bank's existing ATM infrastructure.

FIG. 12 shows an automated transaction machine 110 (e.g., a cash dispensing ATM). The machine 110 is one out of a plurality of an automated transaction machines, each in operative connection with a shared host computer 122. As is well known, the host 122 can communicate with other card account sources (e.g., Bank 1, Bank 2, MasterCard, and Visa) in carrying out a transaction involving the machine.

The machine 110 can include at least one keypad 112, function keys, a touch screen display device 118, and an image reader device 120. The function keys can include a random number request key 114 and a read image key 116. Alternatively, the random number request key 114 and the read image key 116 may be the same key. The machine can also have other well known input and output devices, including conventional ATM devices.

For reasons of brevity, the machine 110 will be referred to herein as an ATM. However, it should be understood that the machine is not limited to an ATM. The transaction machine 110 can comprise other devices, including a depository, check-accepting machine, check-cashing machine, kiosk terminal, self-service machine, vending machine, cash counting device, checkout terminal, gaming device, fuel dispenser, laundry machine, entry access device, etc.

The random number key 114 is pressed to inform the ATM that a new ATM user desires that a random number be generated and displayed. This key can be activated at the start of (or to begin) a new transaction.

The display device 118 is shown displaying the random number 7245. This number was randomly generated by a random number software generation program. The program can be located in either the ATM, the host, or a remote computer in communication with the host and/or ATM. Either the ATM or host or remote computer can correlate the generated number with a time. Alternatively, the random number may have an expiration time built therein or be reflective thereof.

FIG. 13 shows a mobile device 130 (e.g., a cell phone) having input keys 132, a display screen 134, and a camera 136. The phone includes a memory 138 where the card data of several cards (e.g., Bank 1, Bank 2, MasterCard, and Visa) can be stored. As previously discussed, each stored card may be represented in memory by respective card data comprising a PAN and a CVV.

The user selects a card stored in their phone and inputs the displayed random number into the phone. The software program in the phone enables either card selection or random number entry to occur before the other. Next the phone software causes both the selected card's data (e.g., PAN and CVV) and the random number to be encrypted. The software causes the encryption to appear as a single image of a bar code 140 on the phone's display screen 134.

Next the user activates the read image key 116. This informs the ATM that the displayed bar code is ready to be read (or received) by the ATM. The read image key 116 can be pressed either before or after it is positioned adjacent to the bar code reader 120. The ATM software can cause the bar code reader 120 to attempt to read a bar code within a predetermined number of times (or within a preset time period) before quitting. If a bar code cannot be read within the defined limit, then the ATM can prompt the user to make sure the phone is properly positioned, and again attempt the reading. Alternatively, the ATM may cancel the transaction.

Following a successful reading of the bar code image from the phone, the ATM decrypts the read random number. This decrypted number is then compared to the generated and displayed random number. If both, the numbers match and the time allocated for the random number has not expired, then the decrypted PAN and CVV are used to continue the transaction involving the selected card. For example, the next stages of the transaction may include using the CVV to confirm the PAN, and using the PAN to confirm an inputted PIN. The host can conventionally communicate with the issuer of the selected card and the bank affiliated with the ATM to settle the accounts involved in the ATM transaction.

Figure 14:
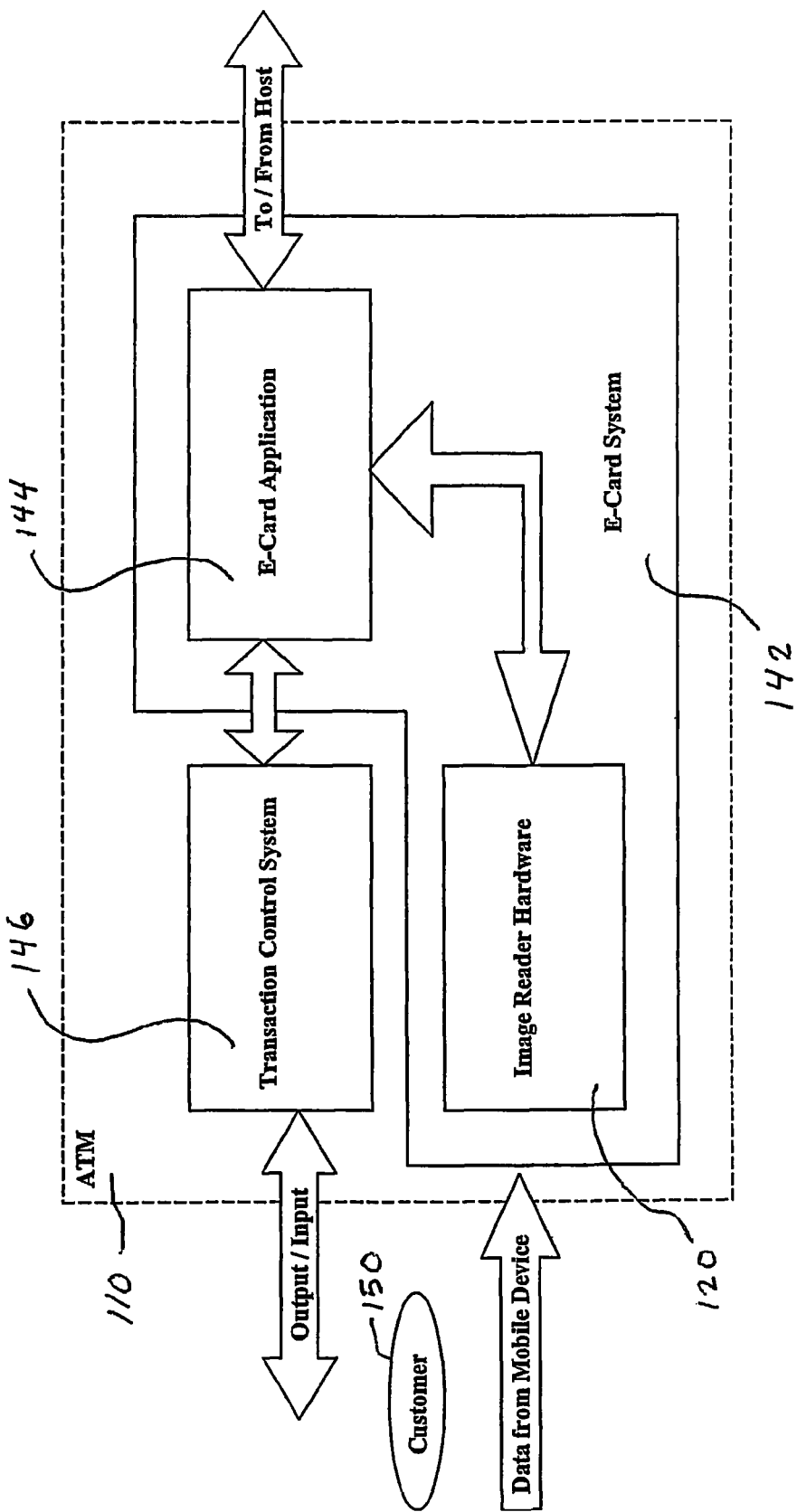
FIG. 14 shows a relationship among a customer, an ATM having electronic card data handling capability, and a host.

FIG. 14 shows a relationship among a customer 150 (e.g., ATM user), the ATM 110, and the ATM host 122. The ATM has installed therein an electronic card (E-card) system 142. The E-card system 142 includes an image reader 120 (e.g., bar code reader device) and an E-card application 144. The E-card application 144 includes software that can control operation of the image reader 120 to read images. The software can also receive read encrypted data from the image reader 120, and carry out decryption of the encrypted data. The software can convert digitally imaged card data into electronic card data. The E-card application 144 is also able to communicate with both the ATM's transaction control system 146 and the host 122 to exchange data.

The transaction control system 146 can include an ATM controller computer. The ATM can provide outputs to the customer, such as via the display device 118. The ATM can also receive inputs from the customer, such as via the keypad 112 and the bar code reader 120. The inputs and outputs can be necessary to carry out a transaction.

Other details, embodiments, relationships, and alternative arrangements are within the scope of the invention. For example, each stored card in a mobile device can be linked to an ID or phone number of a customer for added transaction security. Triple DES encryption of transaction data can be used. A mobile device may include a mobile phone using JAVA midp 2.0 or higher. Other data formats may be used.

As previously discussed, the random code can be manually entered into the mobile device. In alternative embodiments, the code can be wirelessly received from the ATM by the mobile device. For example, RED devices may be used to transmit (from the ATM) and receive (at the mobile device) code information.

It should be understood that for purposes of definition, a "random" code/number as used in the claimed invention does not necessarily have to be truly random. A random number generator, computer software program, or mathematical algorithm can be used. A created random code/number may be based on (or originate from) fixed factors, such as the ATM serial number, and/or zip code, etc. Alternatively, a random code/number may be based on changing variables, such as the current date and/or time, etc. Likewise, fixed and changing data may be used in combination in generating the random code.

The mobile device software can use the code to generate an encrypted image. For example, the software can take the code and make an encryption key. The key can be used to encrypt card data (e.g., PAN, CVV) which corresponds to the selected card. Alternatively, the mobile device software can create an encrypted image without needing the code to make an encryption key.

A digital signature may be used in providing the card data to the ATM. A hand shaking process may be used between the ATM and mobile device to transmit/receive encrypted card data.

As previously discussed, the image including the encrypted information can be in the form of a bar code. However, other alternative image shapes and forms can be used and recognized by the ATM. For example, a string of numbers and/or letters; color patterns; and fonts and/or shades may be used. Three-dimensional images can also be used, including their creation and reading. Image recognition software can be used.

An image (whether or not encrypted) displayed by the mobile device that includes the code and card data can also be captured as a digital picture by camera of the mobile device. The mobile device can then wirelessly transmit the picture (e.g., via e-mail or a proprietary system) to the ATM or the ATM's host.

If sent to the host, then the host can determine the code (which may or may not include decryption) received from the mobile device. The host can compare the determined code to any pending active codes that were received from ATMs on the ATM network. The comparison can identify the correct ATM involved in the transaction (i.e., the ATM that displayed the code to the customer). Thus, the code can also act as an ATM identifier. The host can then forward the code and card data (whether or not encrypted) received from the mobile device to that identified ATM. If necessary, the ATM can then carry out any needed decryption of received data.

In an alternative arrangement, the image displayed by the mobile device can be sans the code. Instead, the displayed code displayed by the ATM can be captured by the mobile device in another digital picture. A first photo file (which includes the card data) and a second photo file (which includes the code data) can then be sent together to the ATM or ATM host. If sent to the host, then necessary data can be forwarded to the ATM that is correlated with the code.

In other alternative arrangements an intermediate device or system can be used between the mobile device and the automated transaction machine. That is, data (e.g., random number, account number, etc.) does not have to be directly exchanged between the mobile device and the automated transaction machine. Rather, the data can first be passed through the intermediate device or system. The intermediate arrangement can also be used to generate the random number for use by the automated transaction machine and/or store the account data for the mobile device.

Thus, the new and improved features and relationships achieve at least one of the above stated objectives, eliminate difficulties encountered in the use of prior devices and systems, solve problems, and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the details shown and described.

In the following claims any feature described as a means for performing a function shall be construed as encompassing any means known to those skilled in the art capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:
an automated banking machine,
   wherein the machine includes a user card insertion slot,
   wherein the machine includes at least one card data reader,
      wherein the at least one card data reader includes a magnetic stripe reader,
         wherein the magnetic stripe reader is operative to read card data corresponding to user identifying information from a magnetic stripe of a user card at least partially inserted into the slot,
      wherein the at least one card data reader includes an RFID tag reader,
         wherein the RFID tag reader is operative to read card data corresponding to user identifying information from an RFID tag of a user card at least partially inserted into the slot,
   at least one computer associated with the machine,
      wherein the at least one computer is operative to control activation of the magnetic stripe reader and the RFID tag reader,
         wherein order of activation between the magnetic stripe reader and the RFID tag reader is predetermined,
      wherein the at least one computer is operative to cause card data read by at least one of the magnetic stripe reader and the RFID tag reader to be compared with information stored in at least one data store,
      wherein the at least one computer is operative to enable a user transaction to be conducted responsive to card data read by at least one of the magnetic stripe reader and the RFID tag reader corresponding in the at least one data store to an authorized user of the machine.

2. The apparatus according to claim 1 wherein the at least one computer causes RFID tag reader device activation before magnetic stripe reader activation.

3. The apparatus according to claim 1 wherein the machine includes a writer device, wherein the at least one computer is operative to cause the writer device to write transaction receipt data to an RFID tag of a user card.

4. The apparatus according to claim 1 wherein the machine includes a user display and at least one currency dispenser.

5. Apparatus comprising:
an automated banking machine,
- wherein the machine includes at least one reader,
  - wherein the at least one reader is operative to read a displayed encrypted image that includes a customer account number while the image is located outside of the machine,
  - wherein the at least one reader is operative to read an encrypted image including both the customer account number and a second number, wherein the second number differs from the customer account number,
- at least one computer associated with the machine,
  - wherein the at least one computer is operative to carry out a transaction responsive at least in part to the read customer account number included in the image.

6. The apparatus according to claim 5 and further comprising a display device, wherein the display device is operative to display a random number enabling viewing thereof by a user of the machine.

7. The apparatus according to claim 6 wherein the machine is operative to carry out a transaction involving the customer account number responsive to a determination that the second number corresponds to the random number.

8. The apparatus according to claim 5 wherein the machine includes a user display and at least one currency dispenser.

9. Apparatus comprising:
an automated banking machine,
- wherein the machine includes at least one reader,
  - wherein the at least one reader is operative to read a displayed encrypted image that includes a customer account number while the image is located outside of the machine,
  - wherein the at least one reader includes a barcode reader, and wherein the barcode reader is operative to read the displayed encrypted image,
- at least one computer associated with the machine,
  - wherein the at least one computer is operative to carry out a transaction responsive at least in part to the read customer account number included in the image.

10. The apparatus according to claim 9
wherein the at least one reader includes a card reading device,
  wherein the at least one computer is operative to cause card data read by the card reading device to be compared with information in a data store,
wherein the at least one reader includes a biometric reading device,
  wherein the at least one computer is operative to cause biometric data read by the biometric reading device to be compared with information in a data store,
wherein a user is authorized to use the machine to carry out a transaction responsive to both
  computer-determined correspondence between card data read by the card reading device and data store information, and
  computer-determined correspondence between biometric data read by the biometric: reading device and data store information.

11. The apparatus according to claim 9 wherein the machine includes a user display and at least one currency dispenser.

12. An apparatus including:
an automated banking machine including at least one computer and at least one display device,
  wherein the at least one computer is operative to cause a machine transaction code to be randomly generated and then displayed through the at least one display device enabling viewing of the code by a user of the automated banking machine.

13. The apparatus according to claim 12
wherein the machine includes at least one user input device,
  wherein the at least one user input device is operative to receive a machine transaction code request from a user of the machine,
wherein the at least one computer is operative to cause the machine transaction code to be randomly generated and displayed responsive to receiving the code request.

14. The apparatus according to claim 13 wherein the machine includes a random code generator, wherein the random code generator is operative to generate the machine transaction code.

15. The apparatus according to claim 12 wherein the machine includes at least one cash dispenser device, wherein the at least one computer is operative to carry out a cash dispensing transaction involving the machine transaction code.

16. An apparatus including
a mobile communication device,
  wherein the mobile communication device includes a display screen and memory,
    wherein the memory stores a customer account number,
  wherein the mobile communication device is operative to generate an image including encrypted data comprising both a transaction code and the customer account number,
  wherein the mobile communication device is operative, to display the image on the display screen.

17. The apparatus according to claim 16 wherein the mobile communication device comprises a phone.

18. The apparatus according to claim 16 wherein the mobile communication device includes at least one manual input device, wherein the mobile communication device is operative to receive the transaction code through the at least one manual input device.

19. The apparatus according to claim 18 wherein the mobile communication device is operative to generate and display an encrypted image comprising a barcode, wherein the barcode includes both the transaction code and the customer account number.

20. A system including:
a cell phone,
  wherein the phone includes a memory,
    wherein the memory stores electronic card data,
      wherein the card data includes at least one card account number,
  wherein the phone includes a display screen,
  wherein the phone is operative to cause a card account number from the memory to be displayed on the display screen in an encrypted format in an image,
an automated banking machine,
  wherein the machine includes an image reader and a cash dispenser,
    wherein the image reader is operative to read the image from the display screen,
  wherein the machine is operative to carry out a transaction involving the card account number.

21. The apparatus according to claim 20
wherein the phone is operative to display an encrypted image including both the card account number and a randomly generated code.

22. The apparatus according to claim 21 wherein the machine is operative to randomly generate and output the code.

23. The apparatus according to claim 22 wherein the phone includes manual input buttons, wherein the phone is operative to receive manual input of the code via the buttons.

24. The apparatus according to claim 23
wherein the phone is operative to display the encrypted image as a barcode,
wherein the image reader comprises a barcode reader,
wherein the barcode reader is operative to read the barcode.

* * * * *